United States Patent [19]

Levit

[11] Patent Number: 5,420,942
[45] Date of Patent: May 30, 1995

[54] METHODS AND DEVICES FOR SELF-CORRECTING VIDEO COMPRESSION

[76] Inventor: Itzhak Levit, 1963 San Ramon Ave., Mountain View, Calif. 94043

[21] Appl. No.: 125,314

[22] Filed: Sep. 21, 1993

[51] Int. Cl.$^6$ .............................. G06K 9/36
[52] U.S. Cl. .................... 382/276; 382/307; 382/293; 348/403
[58] Field of Search .............. 382/56, 41–54; 358/430, 432, 433; 348/420, 404, 403, 405, 412

[56] References Cited

U.S. PATENT DOCUMENTS

| | | | |
|---|---|---|---|
| 4,754,492 | 6/1988 | Malvar | 382/41 |
| 4,816,914 | 3/1989 | Erecsson | 358/133 |
| 5,031,038 | 7/1991 | Guillemot et al. | 358/133 |
| 5,293,580 | 3/1994 | Shimizu | 382/56 |

Primary Examiner—Yon J. Couso
Attorney, Agent, or Firm—Morris Cohen

[57] ABSTRACT

Self-correcting video compression procedures and devices for encoding and decoding and reduction of artifacts of digitized video images and thereby increasing the compression ratio and the efficiency of image storage and transmission by using a best fit surface encoding technique. Encoder accurately processes differential image encoding by computing copy of decoder frame and employing feedback methods.

54 Claims, 17 Drawing Sheets

Microfiche Appendix Included (1 Microfiche, 61 Pages)

| Index | CORRECTION MAP 000000000011111 123456789012 34 | VERTEX MAP 00000000011111111112222222222333333333 123456789012345678901234567890123456 78 |
|---|---|---|
| A | 000010001100 ↑ ↑ | |
| B | 100001000111 00 ↑ ↑ | |
| C | 000010001100 | 000000000000000000000000000000000000 |
| D | 000000000000 ↑ ↑ | 000000000000000000000000000000000000 ↑ ↑ ↑ ↑ ↑ |
| E | 00 ↑↑ | 00000 ↑↑↑↑↑ |
| F | 101101000000 | 000000000000000000001111111111011111 |
| G | 101111001100 ↑ ↑ | 000000000000000000001111111111011111 ↑ ↑ ↑ ↑ ↑ ↑ ↑ |
| H | 110111100111 00 ↑ ↑ | 001000011111111111111111011111 ↑↑↑ ↑ ↑ |

FIGURE 13

| POSITION | ENTRY |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 0 |
| 22 | 0 |
| 23 | 0 |
| 24 | 0 |
| 25 | 0 |
| 26 | 0 |
| 27 | 0 |
| 28 | 0 |
| 29 | 0 |
| 30 | 0 |
| 31 | 0 |
| 32 | 0 |
| 33 | 22 |
| 34 | 0 |
| 35 | 24 |
| 36 | 0 |
| 37 | 0 |
| 38 | 26 |

FIGURE 17

METHODS AND DEVICES FOR SELF-CORRECTING VIDEO COMPRESSION

REFERENCE TO MICROFICHE APPENDIX

Attached hereto and incorporated in its entirety by reference, is Appendix A, in Microfiche form, a pseudo code implementation of the methods. Appendix A consists of a single fiche containing the images of 61 pages of code.

BACKGROUND OF THE INVENTION

FIELD OF THE INVENTION

In the most general terms, the present invention relates to communicating as well as storing and retrieving sequences of images, and more particularly to procedures and devices for compressing the information used to transmit or store a sequence of images. It compresses the information by efficiently encoding both the spatial redundancy i.e. the redundant information present among groups of picture elements ("pixels") of each image ("frame") and the temporal redundancy that exists from frame to frame. In addition to this, the present invention further compresses the information by selectively deleting information whose loss does not materially affect the quality of the sequence of images decoded from the compressed data.

Although the information generated by this invention and by the prior art is applicable to storage and retrieval as well as transmission and reception, for clarity, the descriptions will be in terms of transmission and reception. Applying the concepts to storage and retrieval will be obvious.

DESCRIPTION OF THE PRIOR ART

At present, commercial television standards are the most prevalent means of encoding sequences of images for transmission or storage. The standards for commercial television, both black and white and color, in use today are close derivatives of the standards for black and white television adopted in 1941. The state of the art in 1941 could not support taking advantage of either temporal or spatial redundancy to reduce the amount of information transmitted. Therefore, both commercial black and white and color television systems transmit each pixel of the most spatially redundant image, one in which all of the pixels of the image have the same value. By the same token these systems transmit each pixel of the most temporally redundant sequence of images, those in which the same image is depicted in a sequence of frames.

Commercial black and white television is a lossless system, in that the system deletes no information, while the American color system is an excellent example of a lossy system. A lossless color system with no compression would transmit three times as much information as a comparable black and white system with the same definition. But color television systems would not be commercially viable unless it encoded its color images in a way that black and white television receivers would display these images in appropriate shades of gray. Therefore, color television had to reduce the amount of information transmitted by two thirds without taking advantage of spatial or temporal redundancy.

An ingenious lossy system was invented that discarded the part of color images that aren't perceived by the viewer. The system transmitted images that were seen to be faithful reproductions of the original images with no more information than is used to transmit the same number of black and white images.

The advent of digital transmission and low cost digital-to-analog and analog-to-digital converters and low cost digital logic, and memory components fostered digital compression techniques that compress the amount of information needed to transmit images of a given quality in real time over commercially viable channels. Improvements in display technology allow higher quality images to be captured, transmitted, and viewed. Only the savings realized by compressing the substantial amounts of digitized data that these higher quality images generate will make transmitting such images feasible.

All investigators have recognized the need for compression, the advantage of operating in the digital domain, and the spatial and temporal redundancy in the type of image sequences usually communicated. These investigators recognized that in most of the sequences of interest, such as movies, most frames had large areas that were identical between adjacent frames. Some investigators noticed that many of the differences between frames were due to the moving of the objects depicted, such as people and automobiles. Some of these investigators believe that these objects move in a consistent way, and that encoding this consistent motion would result in greater compression. Some have invented means that only look for and encode this consistent motion between adjacent frames, while others have invented means that look for and encode consistent motion over longer sequences. These inventions differ from each other in what each recognizes as consistent motion and how the recognized motion is encoded.

Therefore, all of the techniques known take advantage of the similarity between frames by differentially encoding. Most techniques encode the difference between each frame and its predecessor. Some techniques take advantage of the consistency of motion over long sequences. Such techniques encode the difference between the beginning and end frames of each consistently moving sequence and also encode how the motion progresses.

All of the techniques do the right thing by differentially encoding, but unfortunately they encode the wrong differences. They encode the difference between two inputs, in this case between two frames, rather than the difference between an input and the effect of the previous input on the output of interest. If the output of interest was identical to its input, then the system would have no problems. But, as discussed below, to reduce the size of the encoded message, the information necessary to produce an identical output is not encoded. Changes are purposely introduced and not accounted for.

Whatever changes are introduced to one frame affects that frame and all subsequent frames that are differentially encoded. As a result of this, the amount of change in the decoded image increases, and the quality of the image decreases, as more and more frames are differentially encoded. Therefore, to keep this buildup of changes within acceptable bounds, systems are forced to keep the number of differentially encoded frames in a sequence to ten or twenty. A new sequence of differentially encoded frames is started with the non-differentially encoded representation of the actual frame. A non-differentially encoded frame typically requires 5 to 10 times more data than a differentially encoded frame. Thus the need to intersperse non-differentially encoded frames into the stream of differentially encoded frames, severely reduces the performance.

The majority of the known systems section each frame into blocks. However, some encoding inventions, are based on quadtree techniques, that attempt to define large areas of differential data that have the same value and encode these areas with a small amount of data, see U.S. Pat. No. 4,816,914, METHOD AND APPARATUS FOR EFFICIENTLY ENCODING AND DECODING IMAGES SEQUENCES. Unfortunately, quadtree techniques can devote a large amount of data in encoding the tree-like mapping to find areas whose differential data do not have the same value.

The most effective encoding techniques presently used or discussed, encode the data of each block by applying The Discrete Cosine Transform (DCT) or some other variation of the Fast Fourier Transform (FFT) to that data. U.S. Pat. No. 5,031,038, PROCESS AND DEVICE FOR THE COMPRESSION OF IMAGE DATA BY MATHEMATICAL TRANSFORMATION EFFECTED AT LOW COST, PARTICULARLY FOR THE TRANSMISSION AT A REDUCED RATE OF SEQUENCES OF IMAGES, describes the variations of the FFT, including the DCT, their operation and characteristics. As seen there, each transform discards information from each block that supposedly is less "active" or is "psycho visually less significant." However, on average, there are 12,288 blocks to an image and great compromises (such as the quantization process) are made to each block that the psycho visual effect on the entire image is unpredictable.

It is well known in the art that the data generated by DCTs and FFTs have a greater range than the data transformed, and that the range of pixel values was chosen for efficient storage of pixel values into computer memories. Therefore, each datum generated by DCTs and FFTs does not fit conveniently into a computer memory. To correct this, the low order part of each datum is truncated, that is, it's discarded. This causes truncation errors. These errors alter the entire image and the discarded data can not be recovered by the decoding procedure. In other words, DCT based systems are lossy, but unlike other lossy systems that discard unimportant parts of the image, these systems arbitrarily discard data, data that may describe important portions of the images. It is also important to know that these compromises almost guarantee that no image can be identically reproduced.

Systems in which blocks are processed independently can generate artifacts (marks in the reproduced frame that were not in the original) on the edges of the blocks. These artifacts are the result of generated information relating to an edge of one block being materially different than that of the edge it is next to. Researchers have attempted to remove or reduce the visual effects of these artifacts with varying success.

Therefore, even though great strides in encoding have been made, great strides can still be made by overcoming the aforementioned problems.

SUMMARY OF THE INVENTION

The inventive METHOD AND DEVICES FOR SELF-CORRECTING VIDEO COMPRESSION has as its objects:

(a) to more efficiently encode sequences of images, so that less data is needed to transmit or store higher quality images;

(b) to eliminate encoding of the images on the basis of the differences between frames in the input, such encoding results in error build up, and therefore eliminating this encoding eliminates the need to intersperse non- differentially encoded frames into sequences of differentially encoded frames;

(c) to serve as the means of encoding frames whether they are consecutive or are the beginning and end frames of a sequence with consistent motion;

(d) to permit the user to determine the type and amount of information to be discarded;

(e) to eliminate the need to discard some of the data so that the remaining data will efficiently fit into computer memories;

(f) to eliminate the truncating errors; and (g) to provide a system that can identically reproduce all frames and can readily trade off the length of the encoded message for the degree of differences allowed.

To achieve these objects, this invention makes two significant improvements. One, it encodes the difference between an input and the effect of the previous input, rather than the difference between two inputs. Thus, in effect, this invention models a feedback system, rather than an open loop system, and gains the well known advantages of feedback systems. And two, it does not transform the pixels, but processes them in their natural state to prevent the errors related to the transformations.

This invention primarily has the encoder generate information essentially identical to the information generated by the decoder ("decoder information") at each stage. The encoder computes an output signal that one or more decoders will receive reflecting the difference between the encoded instant frame and the decoder information just prior to operating on the instant frame. Therefore, the version of the instant frame in the encoder can be fully reproduced by the decoder. The encoder 1.) for internal purposes, encodes each frame individually, without reference to any other frame, and 2.) it generates the difference between the current frame's encoded data and the encoded data of the effects of last frame encoded and transmits or stores this difference. Both processing pixels in their natural, untransformed state, and encoding each frame individually, are markedly different than is done in the systems discussed above.

ENCODING OF EACH FRAME

The process of this invention is sufficiently similar to that used by cartographers that the following analogies between mapping sections of the earth's surface and encoding images help in understanding this invention. For clarity, black and white images will be treated first. Then extending the concepts to process color images will be discussed.

The pixels of a black and white image can be represented as points on a surface in a manner analogous to the way points on the surface of the earth are represented.

Each point on the surface of the earth is uniquely addressed by its location, expressed as its latitude and longitude, and by its altitude. By analogy the location of each pixel is expressed by its x and y values, and the equivalent of its altitude is the value of the pixel which represents the pixel's shade-of-gray.

Carrying the analogy further, cartographers, in mapping sections of the earth, do not attempt to deal with every nuance of the surface, but tend to discard minor variations in altitude. That is, they treat the surface as if it were smoother than it really is. The surfaces they choose are those that minimize the differences between the actual altitudes at the points of interest and the altitudes represented on the surface. In fact, only surfaces are acceptable that meet the restrictions of 1.) none of the differences between the actual altitudes at the points of interest and the altitudes of the surface at these points is greater than a specified amount, and, 2.) in effect, the average of these differences is less than some other specified amount. In the image analogy, the locations of the pixels are the points of interest and the values are the equivalents of the altitudes.

In a way analogous to the above, the preferred embodiments of this invention sections each frame into non-overlapping blocks of $n \times n$ pixels and finds a surface for each block that satisfy similar restrictions. The choice of surfaces is further restricted to those that can be represented by a small number of parameters. As is well known, planes, convex, concave, and saddle shaped surfaces, are examples of the vast number of surfaces that meet this restriction. A plane, for example, can be represented by the location and amplitude of three points on its surface. Therefore, if the pixels in a block are near enough to their equivalent points on a plane, then a system that only knows the three parameters of the plane can reconstruct all of the pixels on the plane and the reproduced block will be quite similar to the original. In fact, if the pixels in a block are on a plane, then the reproduced block will be identical to the original.

The user or system builder chooses the families of surfaces that the system will use. If the families of surfaces chosen are capable of representing the image exactly, then the reproduced block will be identical to the original. Further, one can easily show that the maximum number of surface parameters required for the exact presentation of the worst case image (e.g., random pixels values) is equal to the number of pixels in the image. Fortunately, in most practical cases there exists a very gradual, change between the majority of neighboring pixels of each frame and thus a significantly smaller number of surface parameters are sufficient for the exact presentation of the vast majority of frames.

Rather than employing the same encoding technique for each block of pixels, as the existing methods tend to do, this invention has the user select two types of surfaces: a primary one that is relatively economical (in terms of computing effort, or in the amount of the information generated for a frame, or both) and whose best fit adequately represent the majority of blocks; and a secondary, less economical, more complex surface for the remainder of the blocks. The surfaces used in this invention all have the characteristics that 1) they can be fully represented by the value and location of a set of vertex points; 2) that a vertex point is at each of the corner of each block; and 3) that each edge is fully defined by the vertex points on that edge.

In this invention, each block has the best fit primary surface generated and checked. Only those blocks whose best fit primary surface does not represent the pixels of the block with sufficient accuracy have secondary surfaces generated. Encoding is based on the secondary surfaces for those blocks with such surfaces, and on the best fit primary surface for the remaining blocks.

REMOVING ARTIFACTS

As discussed above, differences in adjoining edges of adjacent blocks cause artifacts, and each edge is fully defined by the vertex points along that edge. Hence, all artifacts are caused by 1) at least one of the vertex points shared by the adjoining edges having different values, or 2) the number or position of the vertex points along one of the adjoining edges is different than those of the other adjoining edge. The first type can only occur on adjoining edges of adjacent blocks both having primary surfaces, or adjacent blocks both having secondary surfaces. The second type of artifacts can only occur on adjoining edges of adjacent blocks, one having primary surface, and the other having a secondary surface.

The first type of artifact is eliminated, and parenthetically the amount of encoded information is thus reduced, in the encoder by replacing the multiple value with the average of the values. The second type is eliminated by 1) effectively recoding the primary surface so that it is represented by vertex points in the relative locations of a secondary surface, and 2) adopting the values of the secondary surface for each vertex point on the adjoining edge. Because the act of eliminating the artifact generates more vertex points and therefore more encoded information, and because the decoder has sufficient information to eliminate this type of artifacts, these artifacts are eliminated in the decoder. In both cases only the adjoining edges are changed.

ENCODING EACH FRAME OF A COLOR IMAGE

Various means of encoding color images exist. Some, like commercial color television, take advantage of the fact that humans cannot discern color where intensity changes abruptly, and only encode color where there are no abrupt changes. Some choose parameters that favor one technology of reproducing images, printing, for example, over all others. Edwin Land has shown that two parameters are sufficient for encoding colors, while all practical systems rely on three independent parameters. In all known color systems, these independent parameters are encoded in a way that a single surface will suffice for the combination of these parameters. To determine if a best fit primary surface represents a block with sufficient accuracy, the parameters have to be separately tested. If any parameter is not represented with sufficient accuracy, then a secondary surface is generated for the block.

BRIEF DESCRIPTION OF THE DRAWINGS

These and other objects, features, and advantages will become apparent and will be amplified in the Description of the Preferred Embodiments together with the following drawings in which:

FIG. 13 illustrates the Correction Map and the Vertex Map and how they are compacted to form field one of encoded signal on Channel 26.

FIG. 17 illustrates the DVM for an instant frame in Vertex Point Compensator 23 with the vertex points shown in FIG. 12 and Coder Reference Frame in Buffer 24 with the vertex points shown in FIG. 11.

DESCRIPTION OF THE PREFERRED EMBODIMENTS

Two versions of the preferred embodiments are described, one hardware related and the other software related. The software related version is to be written in a high level language that will be compiled into object code versions for various computer languages and operating systems. Therefore the software related version should operate on all hardware platform that support these languages.

In the method of the present invention for generating more complex surfaces where needed are referred to both as correction and as generating Secondary Surfaces. Hence the terms "method of correction," "correction method," "generating secondary surfaces", and the like, are considered synonymous. Similarly, the divisions of an image frame are referred to as blocks and sub-blocks as well as sub-images and sub-sub-images, and best fit primary and best fit secondary surfaces are also referred to as best fit surfaces and improved best fit surfaces, respectively.

Figure 1:
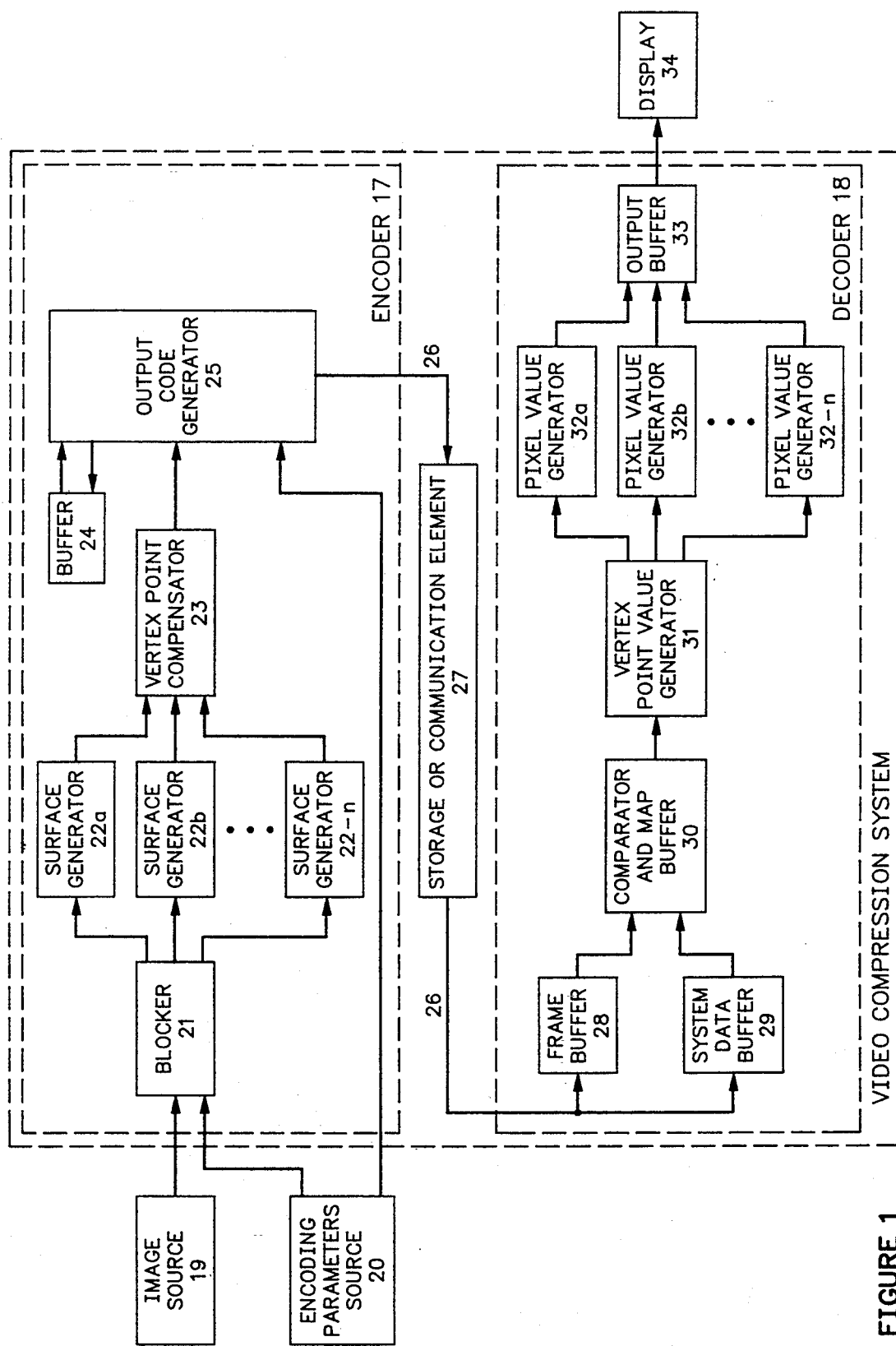
FIG. 1 is a detailed block diagram of the video compression apparatus in accordance with the current invention.

Referring to FIG. 1, a Video Compressor System has an Encoder 17 and a Decoder 18 which are coupled through a storage element or a communication element. Encoder 17 which, in accordance with the preferred embodiments of this invention, has an Image Source 19 for providing a video signal of a sequence of frames in digital form to a Blocker 21. The Encoder 17 also has an Encoding Parameter Source 20 for storing the operating parameters entered by the user at the time the system is set-up. Blocker 21 divides an entire frame into a multitude of Blocks, and presents the Blocks to a bank of Surface Generators 22a through 22n. The bank of Surface Generators 22a through 22n computes a surface sufficiently accurate to be the basis of the encoding for each Block and provides the characteristics of each such surface in the form of a Correction Flag and values of Vertex Points to a Vertex Point Compensator 23. The Vertex Point Compensator 23 generates the Location Map of each surface vertex points based on the block's Correction Flag, resolves all multiple value problems and presents the values and Correction Map of the Vertex Points to an Output Code Generator 25. The Output Code Generator 25 encodes the outputs from the Vertex Point Compensator 23 and from a Buffer 24 which contains the Vertex Point values and Correction Map that define the encoded previous image, updates Buffer 24 and passes the encoded data onto a Channel 26 for storage or transmission to a Decoder 18. Decoder 18 has a Frame Buffer 28 and a System Data Buffer 29 which receives the encoded data on Channel 26. System Data Buffer 29 stores the system parameters of the encoded data and presents it to all of the subsystems of the Decoder 18. In the figures these parameters are shown being presented to a Comparator and Map Buffer 30 and are implicitly passed through the connected subsystems. Comparator and Map Buffer 30 uses these parameters and the frame information it receives from Frame Buffer 28 to locate all of the Vertex Points and their values. Comparator and Map Buffer 30 uses the Correction Map to reconstruct each surface vertex point Location Map, maps the location of each Vertex Point and passes these locations and values to a Vertex Point Value Generator 31. Vertex Point Value Generator 31 resolves any edge inconsistencies and computes the values of the Vertex Points used in resolving these inconsistencies. Vertex Point Value Generator 31 distributes the Vertex Point locations and values to a bank of Pixel Value Generators 32a through 32n which compute the values of all of the pixels presented by the surface and present them to an Output Buffer 33. Output Buffer 33 stores and formats these Pixel Values in a single video frame and presents the reconstructed frame to a Display 34 for imaging.

ENCODING PARAMETER SOURCE 20

Encoding Parameter Source 20 contains the arguments defining the video frame size in pixels w and h, block size in pixels on a side, n, order of the Primary Surfaces, p, packing size, s, the pixel presentation format, f, and three control arguments—the ERR error tolerance, the LS difference threshold value, and the correction method, m. The user can specify each of these arguments and have the specified arguments override the default value provided by the system. Arguments n, and p, are special, in that optimal combinations of these arguments are computable by: n=4p. Therefore, if the user only specifies one of these arguments the system will compute the optimal value for the other argument and replace the default value with it. If neither argument is specified, the default values for these arguments are an optimal pair.

BLOCKER

Blocker 21 divides an entire frame into a multitude of n×n pixel Blocks, according to the Block Size Parameter n provided by the Encoding Parameter Source 20.

Blocker 21 divides the Blocks into as many multi-processable groups as there are Surface Generators and present one such group and the operating parameters entered by the user from Encoding Parameter Source 20 to each of the Surface Generators 22a through 22n.

SURFACE GENERATORS

To reduce the amount of processing and the amount of information encoded, generating the surfaces on which the encoding is based, is a two stage process. A first stage, applied to all blocks, computes a best fit Primary Surface of order p for each Block. These best fit Primary Surfaces are sufficiently accurate to be the basis of the encoding for the majority of Blocks. A secondary stage, applied only to those blocks whose first stage best fit Primary Surfaces are not sufficiently accurate, generates a more complex best fit Secondary Surface for each of these Blocks.

During the first stage, each Surface Generator computes the best fit Primary Surface of order p, provided by the Encoding Parameter Source 20, using:

$$A \cdot \text{Surface\_Parameters} = b \qquad (1)$$

$$A = [A_{ab}]; A_{ab} = \sum_{i=1}^{n \times n} N_a^p(\xi_i, \eta_i) N_b^p(\xi_i, \eta_i) \qquad (2)$$

$$b = \{b_a\}; \sum_{i=1}^{n \times n} N_a^p(\xi_i, \eta_i) \text{Pixel}_i \qquad (3)$$

where $N_a^p(\xi_i, \eta_i)$ is the Primary Surface basis function of order p (Encoding Parameter Source 20) evaluated at the $i^{th}$ pixel location within the block, Surface\_Parameters$_a$ is the $a^{th}$ parameter defining the Primary Surface, Pixel$_i$ is the $i^{th}$ pixel value and $N_{bv}$ is the total number of parameters in the block Primary Surface definition;

for each Block in the group presented to it.

Such best fit surfaces can be effectively represented by Lagrange Polynomials of degree p.

The pixel values of a color image represents the intensity of three or more color components, usually red green and blue. The intensity of each of these color components must be accurately represented in any encoded method. To determine which Blocks will need to be corrected by further processing, Surface Generators 22a through 22n parses the best fit Primary Surfaces into sub-surfaces, one for each color component, and computes each sub-surface's Root Mean Squares error norm, RMS, using:

$$RMS = \sqrt{1 - \frac{\sum_{a=1}^{N_{bv}} b_a \text{Surface\_Parameters}_a}{\sum_{i=1}^{n \times n} \text{Pixel}_i^2}} \qquad (4)$$

and compares each sub-surface's RMS and the ERR Error Tolerance, provided by the Encoding Parameter Source 20.

The best fit Primary Surface of each Block that has a sub-surface whose RMS is greater than ERR is not sufficiently accurate to be the basis of the block's encoding. By the method described below, each Surface Generator 22a through 22n will generate the best fit Secondary Surface for each Block within it whose best fit Primary Surface is not sufficiently accurate. Therefore, each Block has a surface that is sufficiently accurate to be the basis of that block's encoding. In the process of computing these surfaces, Surface Generators 22a through 22n compute the values of Vertex Points that fully define the surfaces. The majority of blocks, those that didn't need correcting, expend relatively very little processing and have very few Vertex Points per block. The others require more processing and have more Vertex Points per block. A decoder knowing the Correction Map of the frame, the correction method m of Encoding Parameters Source 20, and the value of each Vertex Point could reproduce the image frame to within the ERR Error Tolerance.

VERTEX POINT VALUE PROCESSING

Figure 2:
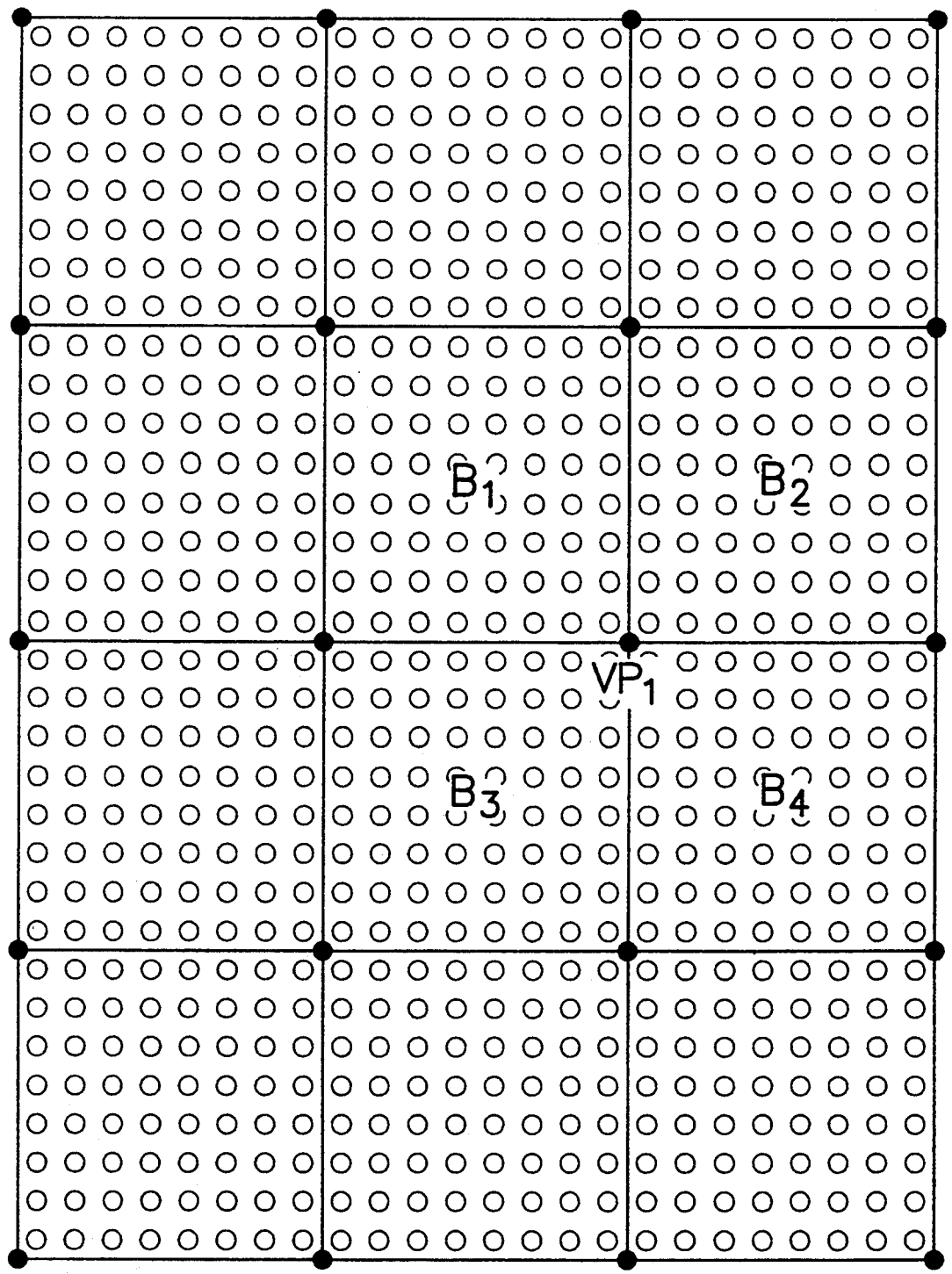
FIG. 2 is an illustration of a $24 \times 32$ pixel frame divided into $3 \times 4$ Blocks of $8 \times 8$ pixels each block capable of being represented by a surface.

Although most actual frames are larger, for purpose of illustration, FIG. 2 shows a 24×32 pixel frame divided into 3×4 Blocks of 8×8 pixels each. Again for the purpose of illustration, p is chosen to be 1. Therefore, the best fit Primary Surface for each Block in FIG. 2 has four vertex points, depicted as filled in circles, one on each corner of the Block. As is apparent in FIG. 2, most corner vertex points are shared by the Blocks whose corner is at the Vertex Point. Vertex Point $VP_1$, for example, is shared by Blocks $B_1$, $B_2$, $B_3$, and $B_4$. By the same token an edge of any surface discussed in this application, regardless of its order, is fully defined by the values at the Vertex Points along that edge.

Since each Block is processed independent of all others, Blocks that share a Vertex Point may have different values on the shared Vertex Point.

Figure 3:
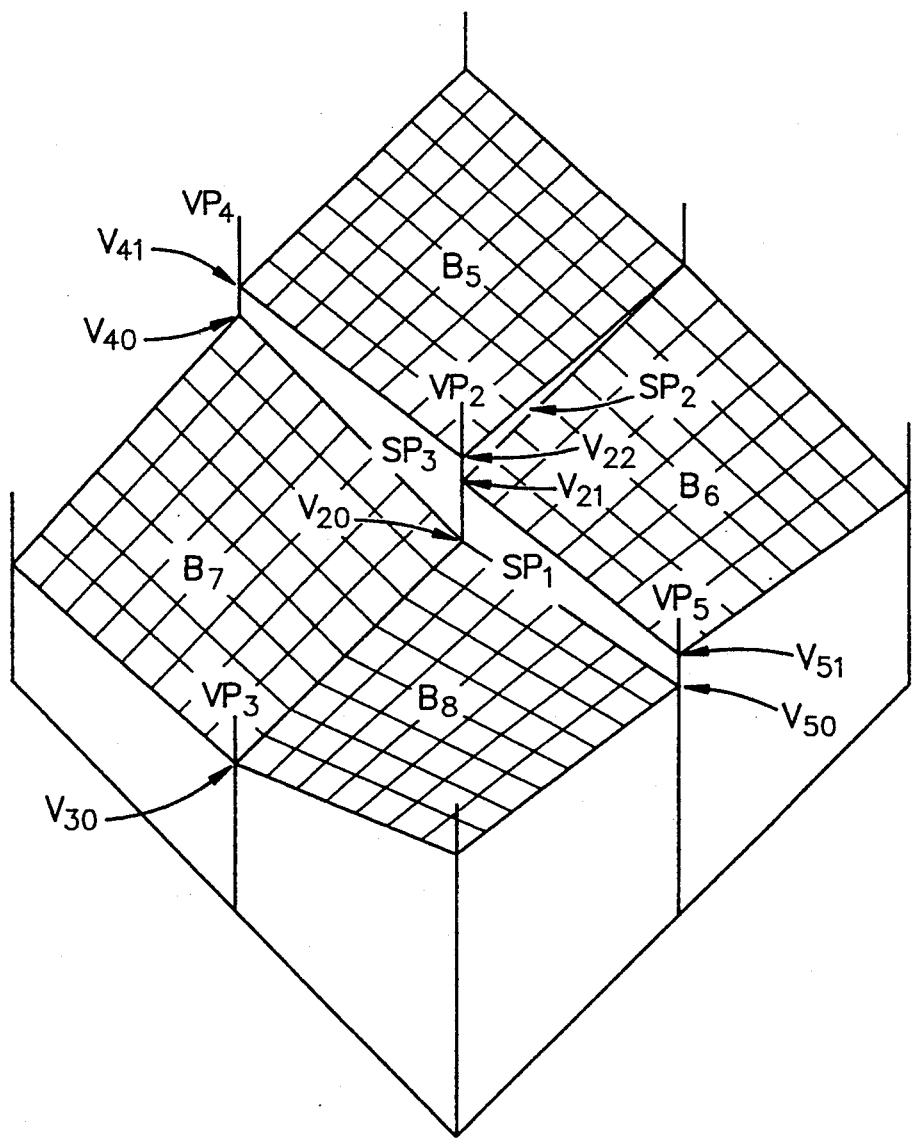
FIG. 3 is a three dimensional illustration of four neighboring bilinear surfaces and their vertex point values. Such bilinear surfaces can be represented by Lagrange Polynomials of degree p, where $p=1$.

FIG. 3 illustrates the best fit Primary Surfaces of a 2×2 block frame. Note that the best fit Primary Surfaces of Blocks $B_7$ and $B_8$ both have Value $V_{20}$ on Vertex Point $VP_2$ and Value $V_{30}$ on Vertex Point $VP_3$. Hence, the adjacent edges of these Primary Surfaces are identical. Conversely, the best fit Primary Surfaces of Blocks $B_5$ and $B_6$ have values at Vertex Point $VP_2$ that are different from each other and different from Value $VP_{20}$ of Blocks $B_7$ and $B_8$.

Such multiple values cause two critical problems. Since the values at Vertex Points are the prime information that is encoded, having multiple values on Vertex Points could cause more information to be encoded. And, as shown in FIG. 3, having multiple values on a Vertex Point causes differences between adjoining edges. These differences cause discontinuities, shown as spaces $SP_1$, $SP_2$, and $SP_3$ in FIG. 3. These discontinuities, in turn, cause artifacts to appear in the reproduced images.

To eliminate the multiple value problems, each Surface Generator presents a Vertex Point Compensator 23 with the Correction Flags and values of all Vertex Points it generates. Vertex Point Compensator 23 generates the Locations Map of the surface vertex points according to the Block's Correction Flag and correction method m of Encoding Parameters Source 20, locates all shared Vertex Points and eliminates all multiple values on shared Vertex Points by averaging the values on each shared Vertex Point.

Figure 4A:
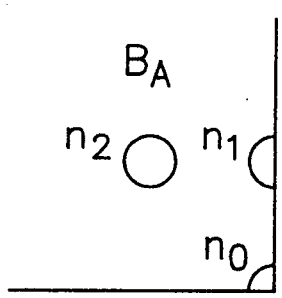
FIG. 4a through 4f are illustrations of all the possible relations between Blocks and Sub-blocks and their corresponding surface vertex points that can exist in accordance with the current invention.
Figure 4B:
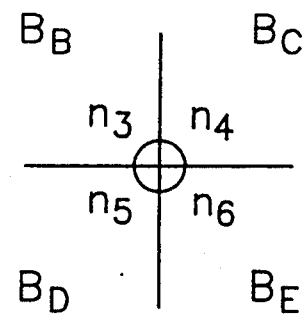
Figure 4C:
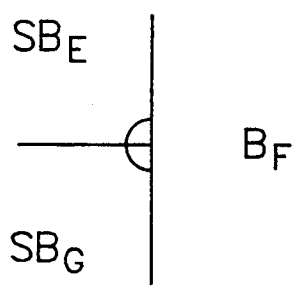
Figure 4D:
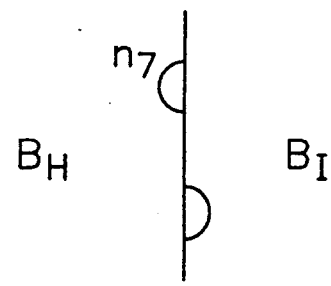
Figure 4E:
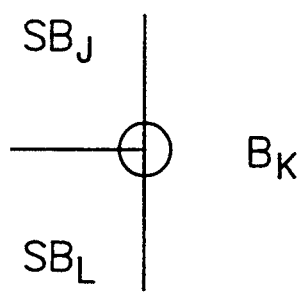
Figure 4F:
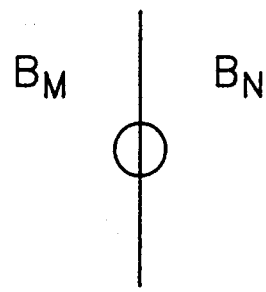

FIGS. $4_a$ through $4_f$ schematically illustrates all of the possible Vertex Point arrangements relative to Blocks and Sub-blocks (described below) that share and do not share a Vertex Point. FIG. $4_a$ illustrates the means of identifying the Vertex Points relative to a Block or a Sub-block $B_4$. Each Block or Sub-block has a vertex Point generated at its corner, shown as the quarter circle $n_0$, and may have Vertex Points on its edge, shown as half circle $n_1$, or fully within its boundary, shown as a full circle $n_2$. FIG. $4_b$ illustrates four Blocks or Sub-blocks $B_B$, $B_C$, $B_D$, and $B_E$, joined at a four-way intersection. The presence of all quarter circles, $n_3$, $n_4$, $n_5$, and $n_6$, indicates that it is shared by Blocks or Sub-blocks $B_B$, $B_C$, $B_D$, and $B_E$, at the intersection. FIG. 4c illustrates a three-way intersection with no Vertex Point generated for Block $B_F$ at the intersection. In this case Sub-blocks $SB_E$ and $SB_G$ share the Vertex Point at the intersection. FIG. 4d illustrates two non shared Vertex Points. Vertex Point $n_7$ is only on $B_H$'s edge. FIG. 4e illustrates a Vertex Point shared by all the Blocks $B_K$ and Sub-blocks $SB_J$ and $SB_L$ at a three-way intersection. FIG. 4f illustrates a shared Vertex Point at a boundary shared by Blocks or Sub-blocks $B_M$ and $B_N$.

Figure 5:
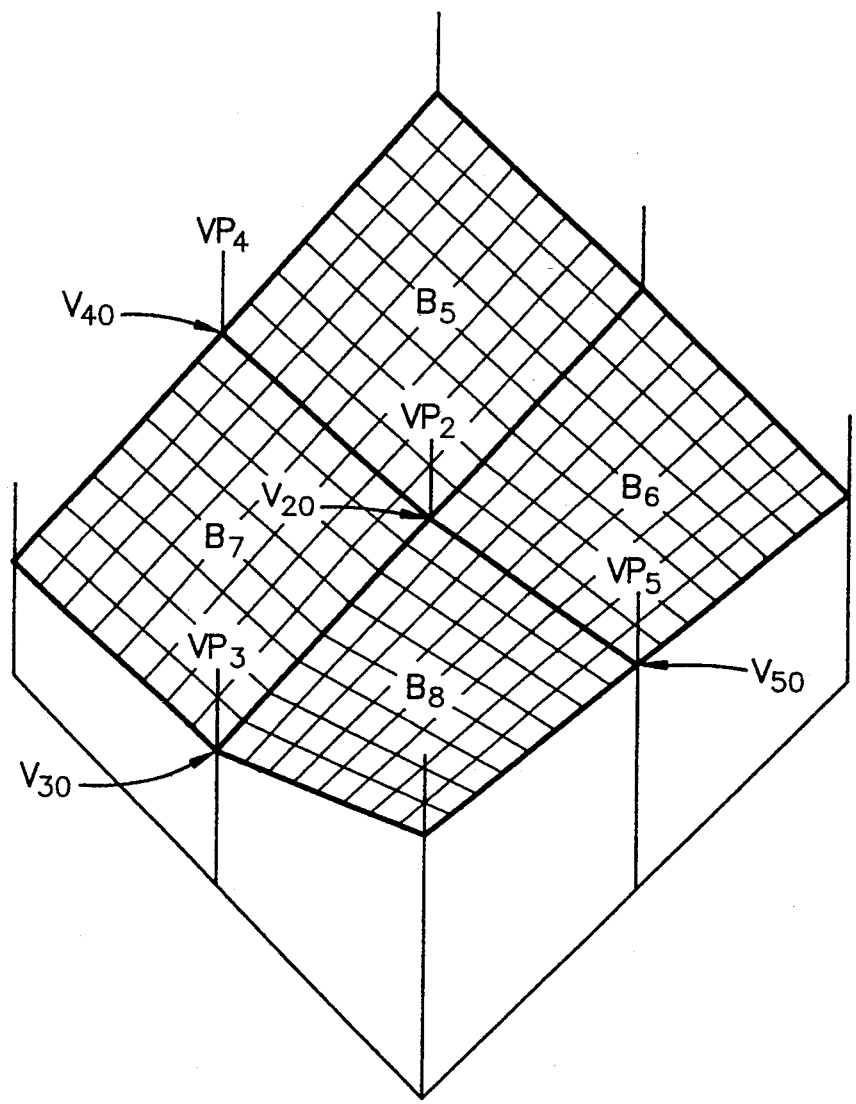
FIG. 5 is a three dimensional illustration of the smoothing effect of the averaging method applied to the data represented by FIG. 3.

The averaging method sums the values provided by the Blocks or Sub-blocks that share a Vertex Point and divides this sum by the number of such Blocks or Sub-blocks. FIG. 5. schematically illustrates the smoothing effect of the averaging method applied to the data represented by FIG. 3.

CORRECTION OR SECONDARY SURFACE GENERATION

The user, when setting up the system, will select one of three methods of generating a Secondary Surface, (hereinafter also referred to as correction), based on the characteristics of the images to be encoded, and will enter the choice and its parameters into Encoding Parameter Source 20. The method of generating a Secondary Surface chosen and its parameters will be conveyed by Encoding Parameter Source 20 through Blocker 21 to Surface Generators 22a through 22n as Correction Method m.

Each method will generate and assign values to additional Vertex Points. The first two methods will compute Secondary Surfaces and generate additional Vertex Points on the edges of the corrected Blocks, while the third method will compute Secondary Surfaces without generating additional Vertex Points on the edges of the corrected Blocks. The introduction of additional Vertex Points on the edge of corrected Blocks causes the adjoined edges of corrected and non-corrected Blocks to be different. These differences, and the artifacts they cause will be eliminated by a Decoder 18. One advantage to the third method is that no such edge differences are caused and no elimination is necessary.

The first method, (hereinafter "the Division Method"), will have the Surface Generators divide each Block to be corrected into a set of Sub-blocks and compute the best fit surface for each Sub-block, the best fit Secondary Surface for the block is the union of all of the Sub-block best fit surfaces.

The second method, (hereinafter "the Higher Order Method"), effectively assigns a higher value to p, p', and for each Block to be corrected, computes the best fit Secondary Surface of order p'.

Again, the best fit secondary surfaces can be effectively represented by Lagrange Polynomials of degree p.

The third method, (hereinafter "the Compatible Edge Method"), will compute a Secondary Surface compatible with the Primary Surface along its edges. The Compatible Edge Method generates additional Vertex Points inside the block, but not on the edges.

Figure 6:
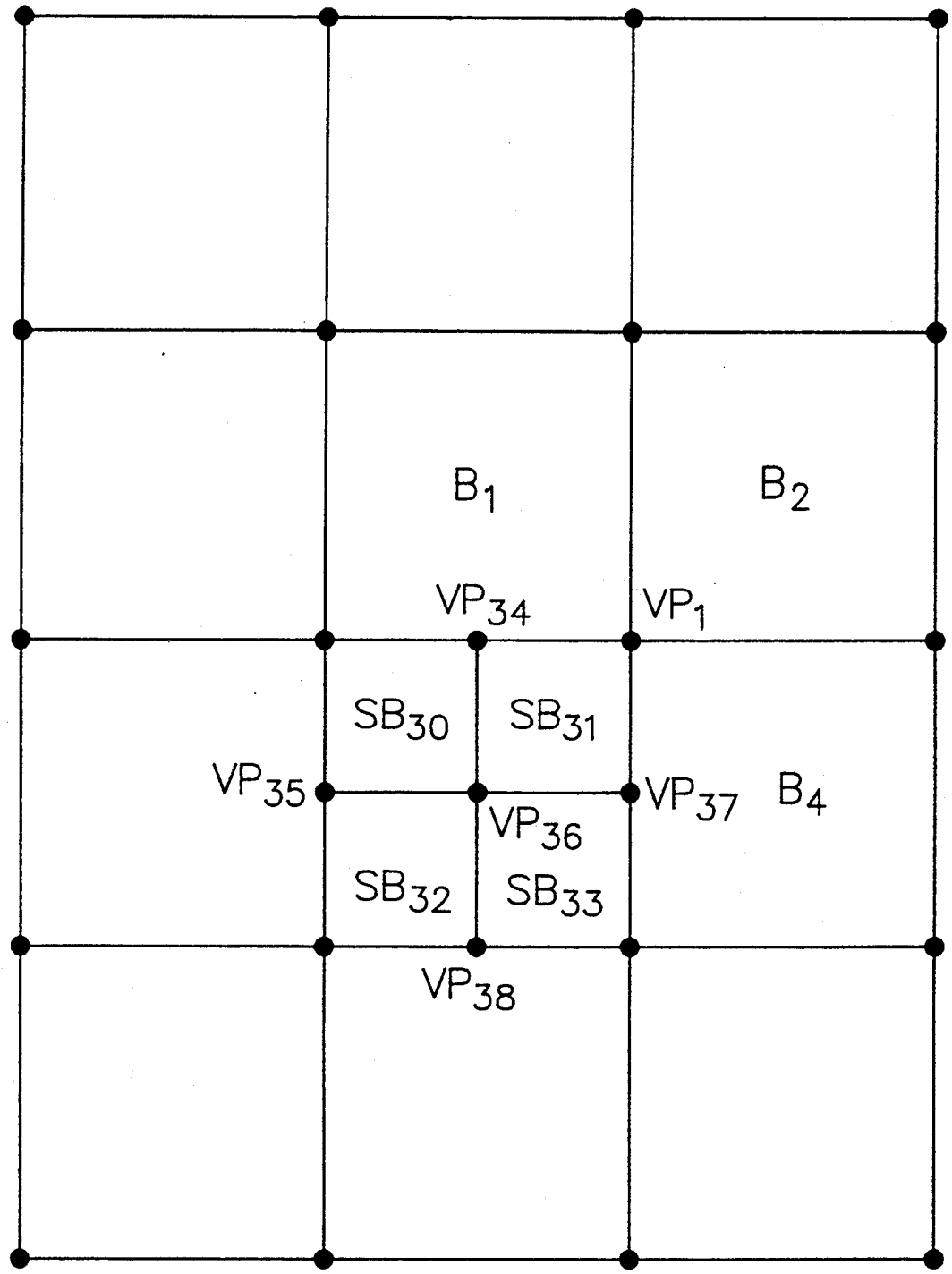
FIG. 6 illustrates correction by the Division Method applied to the image of FIG. 2.

FIG. 6, illustrates correction by the Division Method applied to the image of FIG. 2. For purpose of illustration, a Block is corrected by division into four $n/2 \times n/2$ Sub-blocks and the best fit Secondary Surfaces have the same order p=1 as the Primary Surfaces. Block $B_3$ is corrected by subdividing it into Sub-blocks blocks $SB_{30}$, $SB_{31}$, $SB_{32}$, and $SB_{33}$ and generating new Vertex Points $VP_{34}$, $VP_{35}$, $VP_{36}$, $VP_{37}$ and $VP_{38}$ so that each of the Sub-blocks has four Vertex Points.

Figure 7:
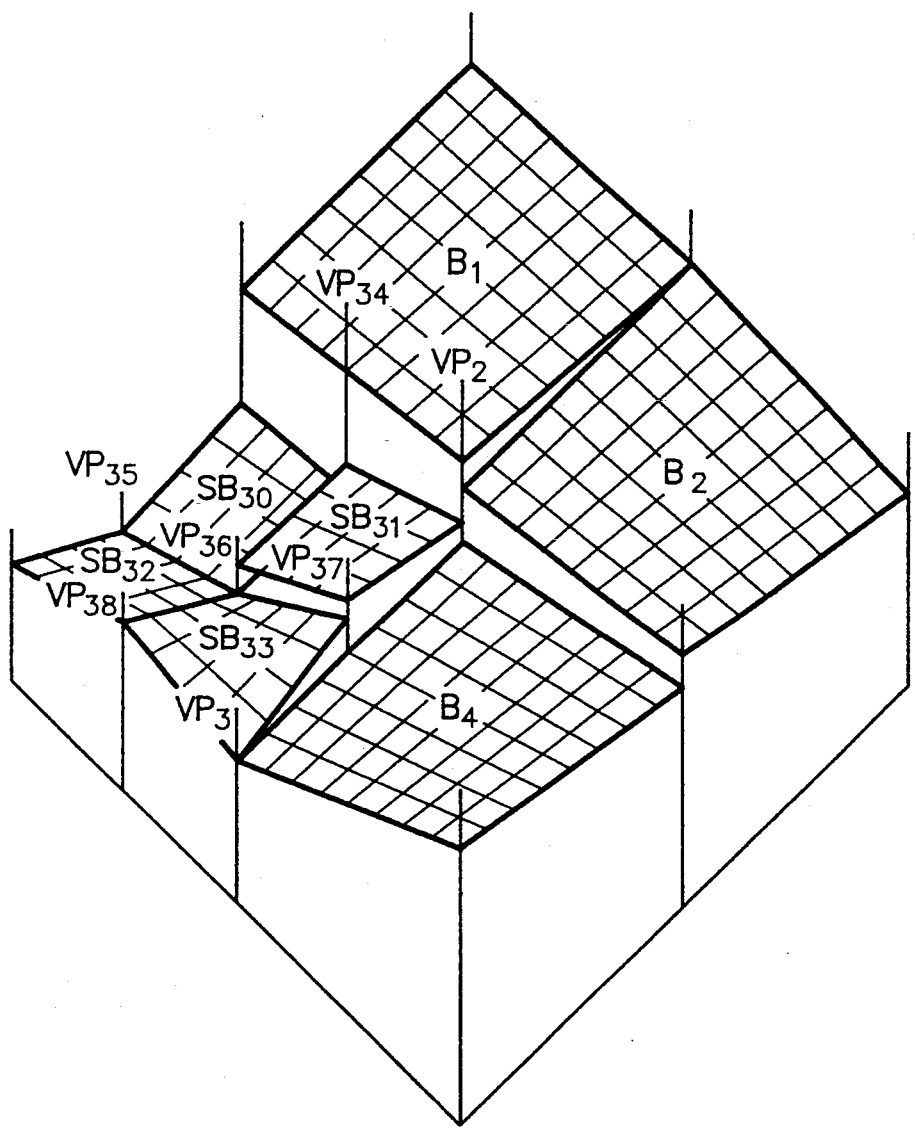
FIG. 7 illustrates Block $B_3$ of FIG. 3 being corrected by the Division Method.

FIG. 7 shows Block $B_3$ of FIG. 3 being corrected by the Division Method. Block $B_3$ is divided into Sub-blocks $SB_{30}$, $SB_{31}$, $SB_{32}$, and $SB_{33}$. As shown, the best fit Secondary Surface of Sub-blocks $SB_{31}$ has values at Vertex Points $VP_2$, $VP_{34}$, $VP_{36}$, and $VP_{37}$ that are different than the values of its neighboring Block and Sub-blocks.

Figure 8:
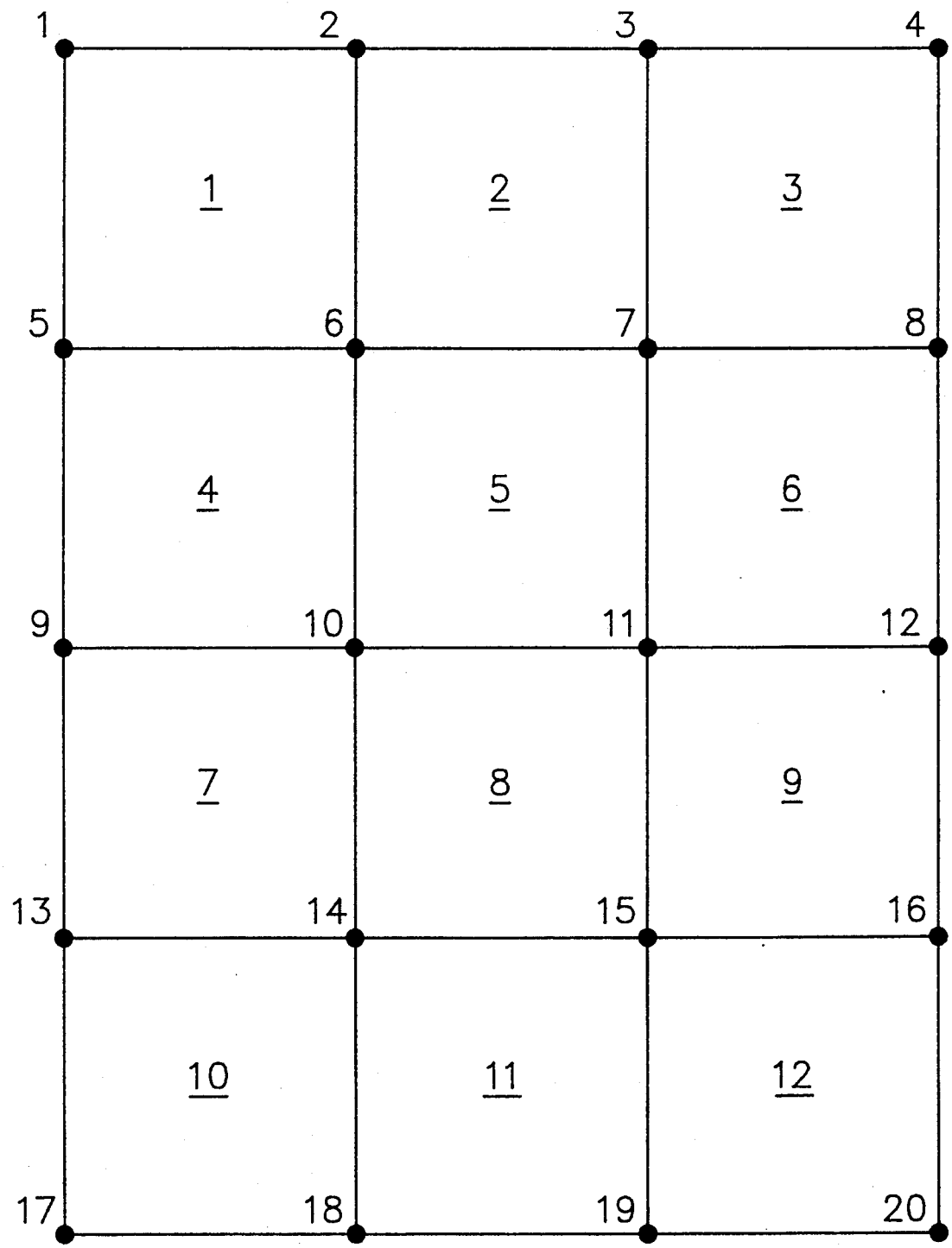
FIG. 8 illustrates the sequential numbering scheme or a 3×4 block frame and the order of the each Primary Surface p=1.
Figure 9:
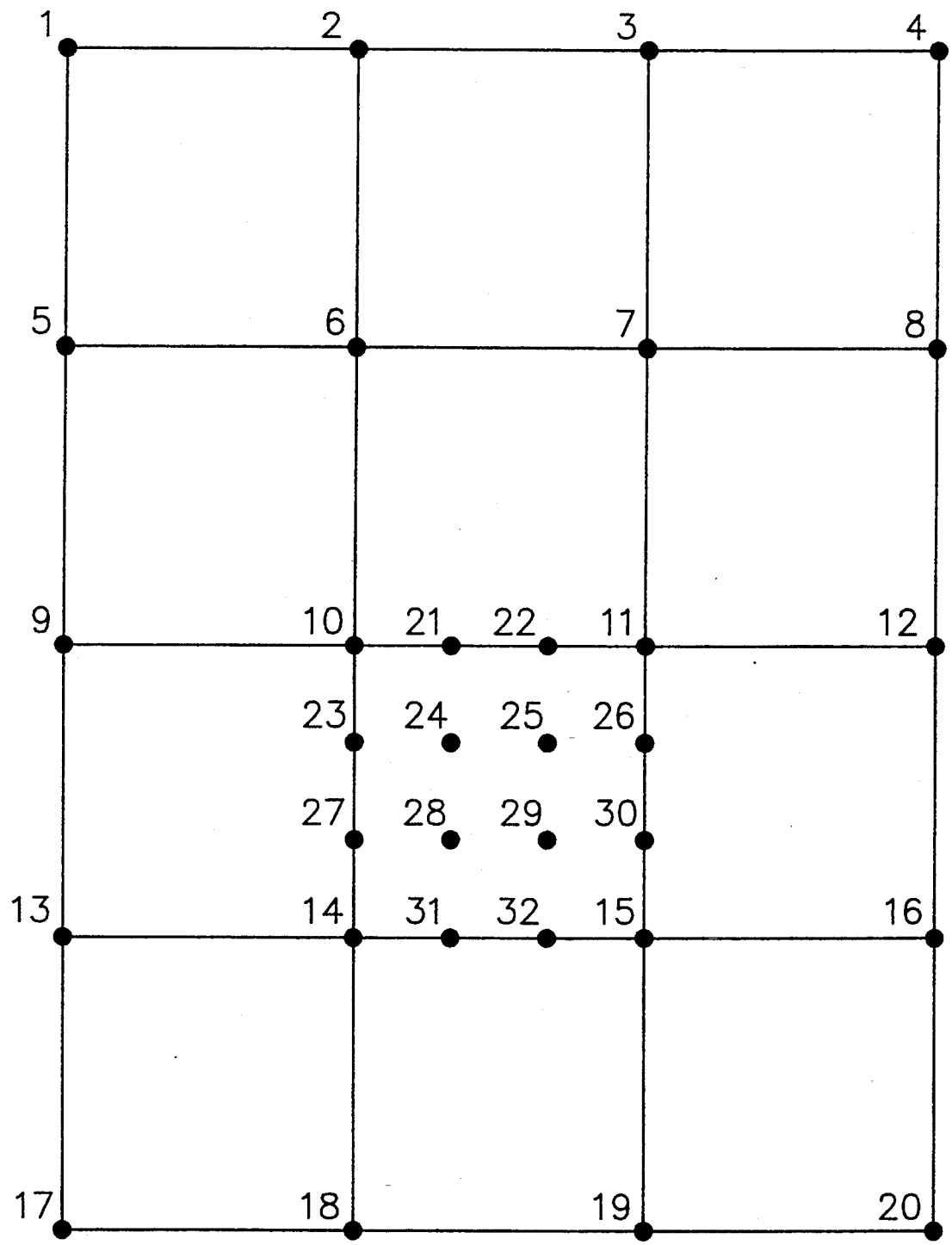
FIG. 9 illustrates correction of block 8 of FIG. 8 using the Higher Order Method.

FIG. 9, illustrates correction by the Higher Order Method applied to an image. Block 8 of FIG. 8 is corrected by computing the best fit Secondary Surface for order p'. In this Figure p'=3. Hence 12 new Vertex Points, 21 through 32 are generated.

Figure 10:
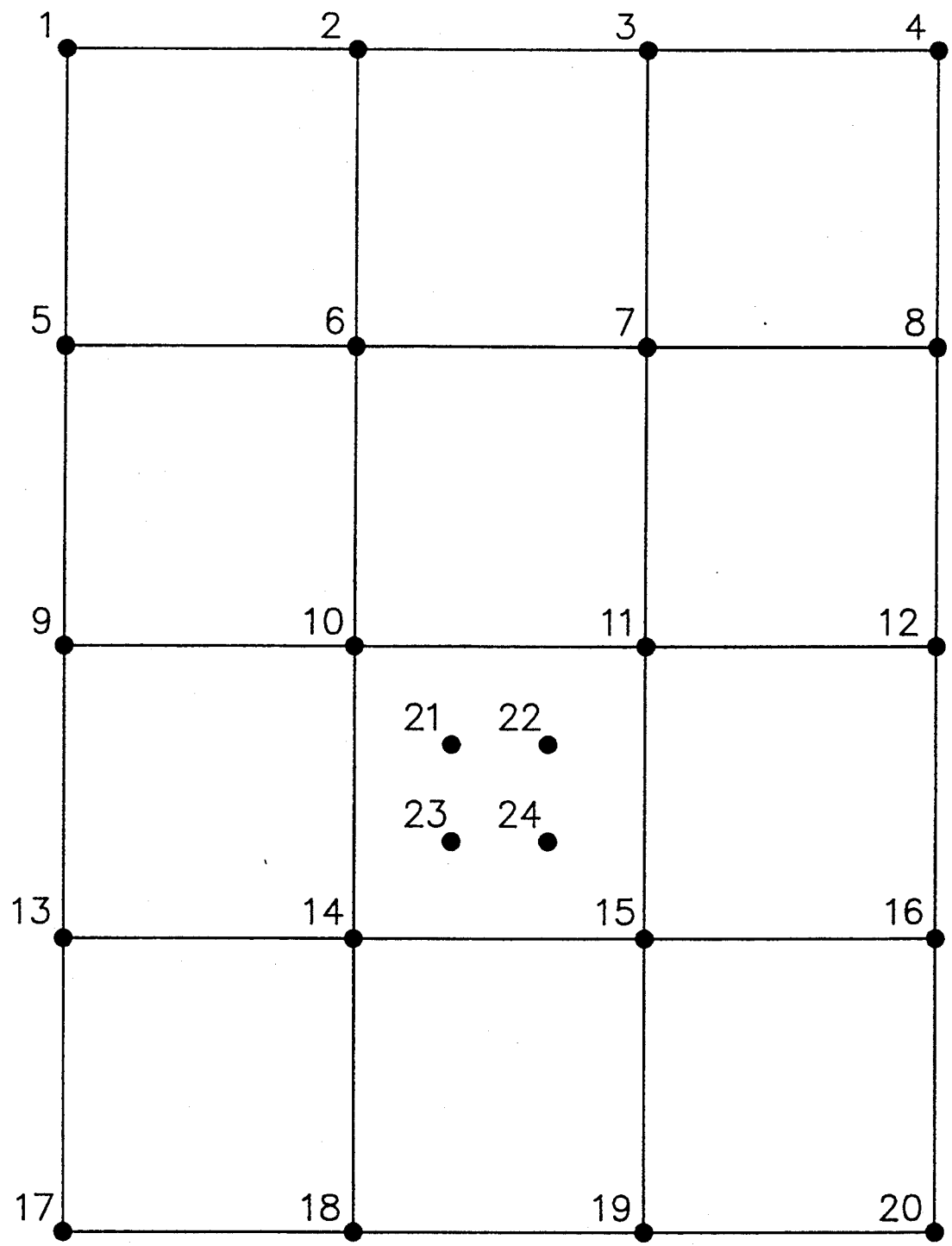
FIG. 10 illustrates correction of block 8 of FIG. 8 using the Compatible Edge Method.

FIG. 10 shows Block 8 of FIG. 8 being corrected by the Compatible Edge Method applied to an image. Note that no new Vertex Points are generated along any edge while Vertex Points 21 through 24 have been generated within the boundary.

VERTEX LOCATION PROCESSING

The invention, according to the preferred embodiments, has Vertex Point Compensator 23 number the new Vertex Points caused by correction so that a contiguous numbering scheme results.

Figure 11:
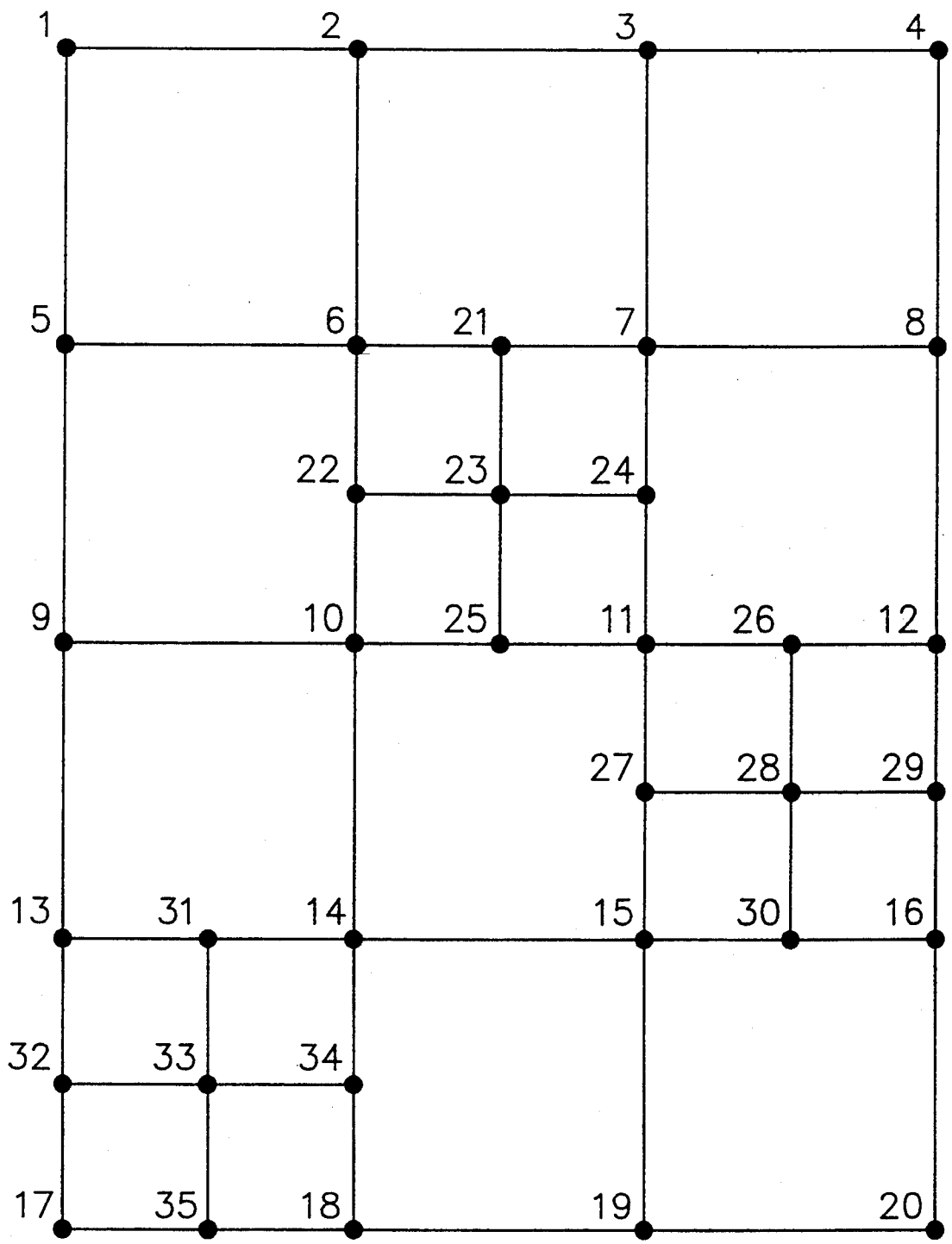
FIG. 11 and 12 illustrate correction by the Division Method applied to consecutive frames of the type illustrated by FIG. 2.
Figure 12:
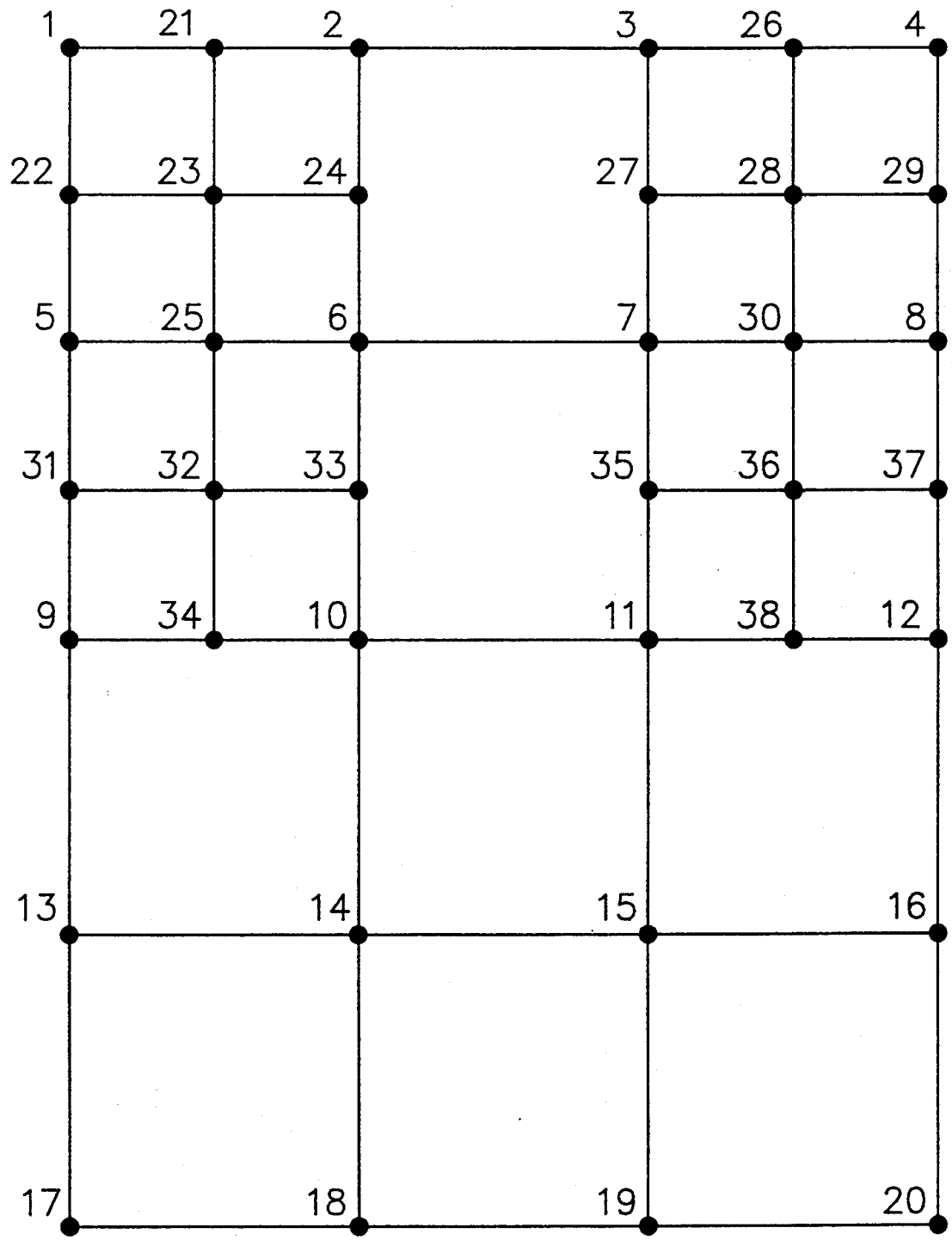
Figure 14A:
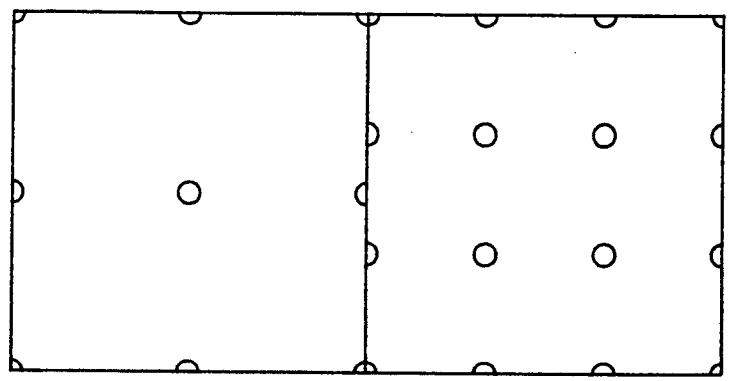
FIG. 14a and 14b illustrate the method for eliminating the artifacts along the common edge of a corrected and an uncorrected block.
Figure 14B:
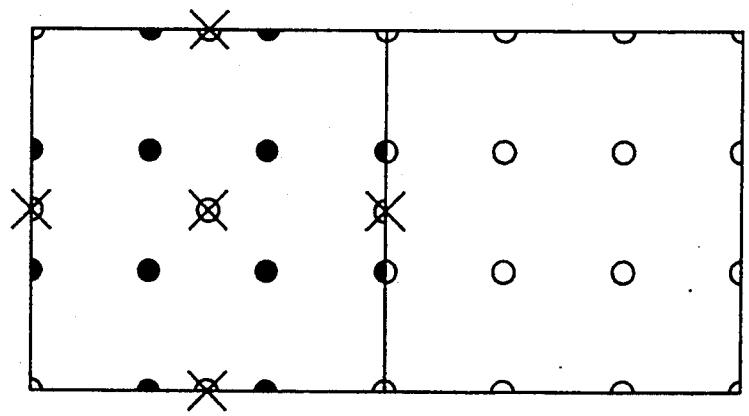

This sequential numbering scheme is illustrated in FIG. 8 for a $3 \times 4$ block frame and the order of the each Primary Surface p=1. FIG. 8 illustrates the numbering scheme generated when the system is set up and consists of the Block Numbers and the Vertex Points prior to correction. FIGS. 11 and 12 illustrate extensions to the numbering scheme for blocks that are corrected by the division method, but are applicable to each correction method.

New Vertex Points are assigned numbers starting with the next higher number, 21 in this example, and continuing in sequence. The numbers are assigned to the new Vertex Points of the corrected blocks in the numbered order of the blocks. The corrected block with the lowest number, Block 5 in FIG. 11, Block 1 in FIG. 12, has the lowest numbers assigned to its new Vertex Points, followed by the next lowest numbered corrected block, and so on. The new Vertex Points in a corrected block are numbered in left-to-right, top-to-bottom sequence. As is illustrated in FIG. 12, any new Vertex Point that was numbered as part of a lower numbered corrected block is skipped when numbering new vertex points of higher numbered corrected blocks. Vertex Point 25 in FIG. 12 was numbered as part of Block 1 and is skipped when numbering the new vertex points of Block 4, for example.

Vertex Points numbered 22 and 24 in FIG. 11 are numbered 33 and 35 in FIG. 12 because different blocks were corrected in the two figures. Therefore, as discussed below, if the Frame depicted in FIG. 12 immediately followed that depicted in FIG. 11, then the value at those Vertex Points in FIG. 11 would be compared with the values at the same Vertex Points in FIG. 12 regardless of the disparity in how they are numbered.

This numbering scheme requires the knowledge of the blocks that have been corrected. In the preferred embodiments, the knowledge which Blocks have been corrected is generated and stored in a one-bit-per-block Correction Map. The Correction Map is positionally encoded. Each bit in the Correction Map relates to the block whose number matches the position of the bit, so that the status of block 9 is represented by the Correction Map's ninth bit. Each bit containing a 1 indicates that its associated block is corrected, while the bits associated with each block that is not corrected, contains a 0.

INSTANT FRAME ENCODING

Vertex Point Compensator 23 contains the representation of the instant frame and Buffer 24 contains the Coder Reference Frame which Encoder 17 generates to be identical to the information that is or will be in Decoder 18 prior to Decoder 18 processing the instant frame. Both the representation of the instant frame and the representation in the Coder Reference Frame, are in the form of Vertex Points. Output Code Generator 25 compares the values of the vertex points of the instant frame, in Vertex Points Compensator 23, to the values of the comparable vertex points in the Coder Reference Frame in Buffer 24. Output Code Generator 25 selects 1.) each vertex point in Vertex Point Compensator 23 whose value is different than that of the comparable vertex point in Buffer 24 by more than threshold value LS, and 2.) each vertex point in Vertex Point Compensator 23 for which no comparable vertex point exists in Buffer 24. Output Signal 26 for the instant frame is the compacted form (see below) of the selected vertex points. Since Encoder 17 used information to generate Output Signal 26, that is identical to that in Decoder 18 at the same stage of processing, Decoder 18 can regenerate the representation of the instant frame.

Such encoding overcomes a "creeping change" error that impacts systems which encode differences between images of consecutive frames. Most systems do not encode differences that is less than a threshold value. Therefore, any unidirectionally changing pixel whose rate of change is less than the threshold value is not encoded. Assuming that the threshold value is three, the value of a pixel is ten in the first frame and the rate of change of the pixel is two per frame, then no new value of that pixel will be encoded until a correction frame of a full image is encoded. After sixteen frame are differentially encoded, that pixel value is still the original ten although the value of that pixel in the source image is forty.

In the preferred embodiments of this invention if a Vertex Point Value was to creep in the same fashion, and with the same parameters as the Pixel above, the value would automatically be corrected whenever the difference between the Vertex Point value of the frame as displayed, and the Vertex Point value for the source frame exceeds the threshold value: For the second frame, the Vertex Point value is twelve, the difference between it and the original Vertex Point value of ten in the Coder Reference Frame is less than the threshold value, therefore that Vertex Point Value is not encoded or set into the Coder Reference Frame; For the third frame, the Vertex Point value is fourteen, four higher than the Vertex Point value of ten in the Coder Reference Frame, this difference is greater than the threshold value, therefore that Vertex Point Value is encoded and set into the Coder Reference Frame; For the fourth frame, the Vertex Point value is sixteen, the difference between it and the Point value of fourteen in the Coder Reference Frame is less than the threshold value, therefore that Vertex Point Value is not encoded or set into the Coder Reference Frame; For the fifth frame, the Vertex Point value is eighteen, four higher than the Vertex Point value of fourteen in the Coder Reference Frame, this difference is greater than the threshold value, therefore that Vertex Point Value is encoded and set into the Coder Reference Frame; and so on.

The operation of encoding proceeds as follows: A user enters a sequence of image frames to be encoded and starts the process. Encoding Parameter Source 20 provides its parameters to an Output Code Generator 25 which Output Code Generator 25 encodes as a header and presents it as Output on Channel 26. Output Code Generator 25 resets Buffer 24 and sets an internal flag to indicate that a first frame is to be encoded. Output Code Generator 25 is presented with the instant frame's Correction Map and Vertex Point values by Vertex Point Compensator 23, and on the basis of this being a first frame, presents this data to Buffer 24. Output Code Generator 25 formats the Correction Map and the instant frame's Vertex Point values, and by a method discussed below, presents it as Output on Channel 26.

For the next and all subsequent frames, Buffer 24 and Vertex Point Compensator 23 present their information to Output Code Generator 25. Output Code Generator 25 will encode the Correction Map from Vertex Point Compensator 23. Since the Coder Reference Frame and the instant frame may have different Vertex Point numbers for the same Vertex Points, Output Code Generator 25 relates their Vertex Point numbers and determines which vertex points are present in both and which Vertex Points are only in Vertex Point Compensator 23. Vertex Points that are only in Vertex Point Compensator 23 are new and their instant values must be encoded. Some Vertex Points, that are present in both Buffer 24 and Vertex Point Compensator 23, have their instant value encoded; they are those whose values in Buffer 24 and Vertex Point Compensator 23 differ by more than the Difference Threshold Value LS, provided by Encoding Parameter Source 20.

The Vertex Points which have their values encoded, must be identified for Buffer 24 and Decoder 18 and their values updated in Buffer 24. To identify these Vertex Points, Output Code Generator 25 computes a positionally encoded, Vertex Map with one bit per Vertex Point. Each bit corresponding to a Vertex Point value whose instant value is to be encoded is set to 1.

The Output Code Generator 25 presents the instant frame Correction Map and the updated Vertex Point values to Buffer 24, and by a method discussed below, formats and presents Correction Map, the Vertex Map and the Vertex Point values to be encoded as Output on Channel 26.

OUTPUT FORMAT

The first field of the encoded signal contains a compacted coding of the Correction Map and Vertex Map of the instant frame. FIG. 13 illustrates the Correction Map and the Vertex Map and how they are compacted to form field one of encoded signal on Channel 26.

The Correction Map is refined by placing a 0 in each position whose instant block and whose block in Coder Reference Frame were both corrected or both not corrected.

The bits in the Correction Map, as refined, and the Vertex Map are compacted by being grouped into s bit groups, s being the Packing Size Parameter provided by Encoding Parameter Source 20, and each group is represented in the first field by a 0 if all the bits in the group are set to 0. If any of the bits in the group has a 1, then that group is represented by a 1 followed by a copy of the bits in the group.

The encoded signal on Channel 26 for a sequence of frames consists of a header containing the parameters in the Encoding Parameter Source 20, followed by the records for the frames. Each frame's record consists of its compacted field followed by the values of the vertex points whose associated bits in the Vertex Map is 1, in Vertex Point number order.

FIG. 13 relates to a three frame sequence whose first two frames are identical and have a correction pattern shown in FIG. 11. The third Frame has a correction pattern shown in FIG. 12. FIG. 13 has S=8, and arrows depicting the beginning bit of each group.

FIG. 13A represents the first frame. Since it has no predecessor, FIG. 13A represents both the first and second stage of code for the Correction Map and the Vertex Map is not sent.

FIG. 13B is the compacted field of this first frame.

FIGS. 13C and 13F represent the first stage code of the Correction Map and the Vertex Map of the second and third frame.

FIGS. 13D and 13G represent the second stage code of the Correction Map and the Vertex Map of the second and third frames.

FIGS. 13E and 13H are the compacted fields of the second and third frames.

CODER AND DECODER REFERENCE FRAMES

Buffer 24 computes the contents of the Coder Reference Frame and Comparator and Map Buffer 30 computes the Decoder Reference Frame using the same method. For ease of explanation the method as it relates to Buffer 24 is described.

The Correction Map, and the Vertex Point values of the first frame to be encoded is placed in Buffer 24. For the second and all subsequent frames, Output Code Generator 25 first generates a Differential Vertex Map, DVM. DVM has one entry per vertex point in Vertex Point Compensator 23, and is positionally notated. The entry in position 33, for example, relates to vertex point number 33 of Vertex Point Compensator 23. Each entry is a vertex point number or zero. If the entry at position n of the DVM is zero, then there is no vertex point in Buffer 24 at the same location as vertex point n of Vertex Point Compensator 23. If a positive number, k, is the entry in position n of the DVM, then vertex point k of Buffer 24 and vertex point n of Vertex Point Compensator 23 are at the same location.

FIG. 17 illustrates the DVM for an instant frame in Vertex Point Compensator 23 with the vertex points shown in FIG. 12 and Coder Reference Frame in Buffer 24 with the vertex points shown in FIG. 11. The vertex point numbering system causes the first twenty entries to contain the numbers 1 through 20 because the block corner vertex points are identically numbered in each frame. Entry 33 contains 22 and entry 35 contains 24 indicating that vertex points 33 and 35 of the instant frame in Vertex Point Compensator 23 are at the same locations as vertex points 22 and 24 of the Coder Reference Frame in Buffer 24. The rest of the entries contain zeros, indicating that Buffer 24 has no Vertex Points at the locations of the vertex points of Vertex Point Compensator 23 associated with the positions of DVM containing zeros.

The Output Code Generator 25 compares Vertex Points values of the instant and reference frames using the Differential Vertex Map. Vertex Points of the instant frame for which the corresponding value in the Differential Vertex Map is 0 are new vertex points that do not exist in the Reference Frame and their position bit in the Vertex Map is set to 1 and their values is appended to the second field of Signal 26.

Vertex Points of the instant frame for which the corresponding value in the Output Code Generator 25 is positive are compared to their counterparts in the Reference Frame. If the two values differ by more than the LS Threshold value of System Parameters Source 20 their position bit in the Vertex Map is set to 1 and their values is appended to the second field of Signal 26. However, if the two values do not differ by more than the LS Threshold value of System Parameters Source 20 their position bit in the Vertex Map is set to 0 and their value in the instant frame is updated to match that of the Reference Frame. The updated instant frame is the next coder Reference Frame.

Output Code Generator 25 packs Correction Map and Vertex Map of the instant frame as the first field of Signal 26 using the Output Format above and sends the updated instant frame Vertex Point Values and Correction Map to Buffer 24 to be used as Reference Frame for the next frame.

DECODER

FIG. 1 shows a Decoder 18 which receives the encoded signal on Channel 26 from a communication line or from a storage device. Decoder 18 contains a Frame Buffer 28 and a System Data Buffer 29. System Data Buffer 29 receives the system data from the header of Encoded Signal 26 and stores it. Frame Buffer 28 receives and buffers one frame of information and presents it to a Comparator & Map Buffer 30. From the frame of information and from the control information provided by System Data Buffer 29, Comparator & Map Buffer 30 reconstructs the Correction Map and Vertex Map and provides these maps to a Vertex Point Value Generator 31. Vertex Point Value Generator 31 places the packed vertices data values at the proper Vertex Point locations.

Discontinuities caused by the Division or Higher Order Method of correction, are eliminated by the Vertex Point Value Generator 31. Eliminating these discontinuities is possible because 1.) Each corrected block has more Vertex Points, and 2.) any surface referred to in this specification that can be represented by the values of a specific set of Vertex Points can be represented by the values of another set that has more Vertex Points.

In the preferred embodiments, Vertex Point Value Generator 31 determines which uncorrected blocks are adjacent to corrected blocks. For each such uncorrected block, Vertex Point Value Generator 31 computes the locations of a set of Vertex Points identical to that of a corrected block, and computes the values of these Vertex Blocks necessary to represent the block's Primary Surface. Vertex Point Value Generator 31 replaces the original set of Vertex Points and their values with this computed set. This causes all of the Vertex Points along the adjacent edges of the adjoining corrected and uncorrected blocks to be shared. By replacing the multiple values on these shared Vertex Points with the values of the corrected blocks, Vertex Point Value Generator 31 eliminates the discontinuities.

This is illustrated in FIGS. $14_a$ and $14_b$. FIG. $14_a$ shows the Blocks prior to the new Vertex Points being inserted. FIG. $14_b$ shows the uncorrected blocks having a Vertex Point pattern identical to a corrected block.

Figure 15:
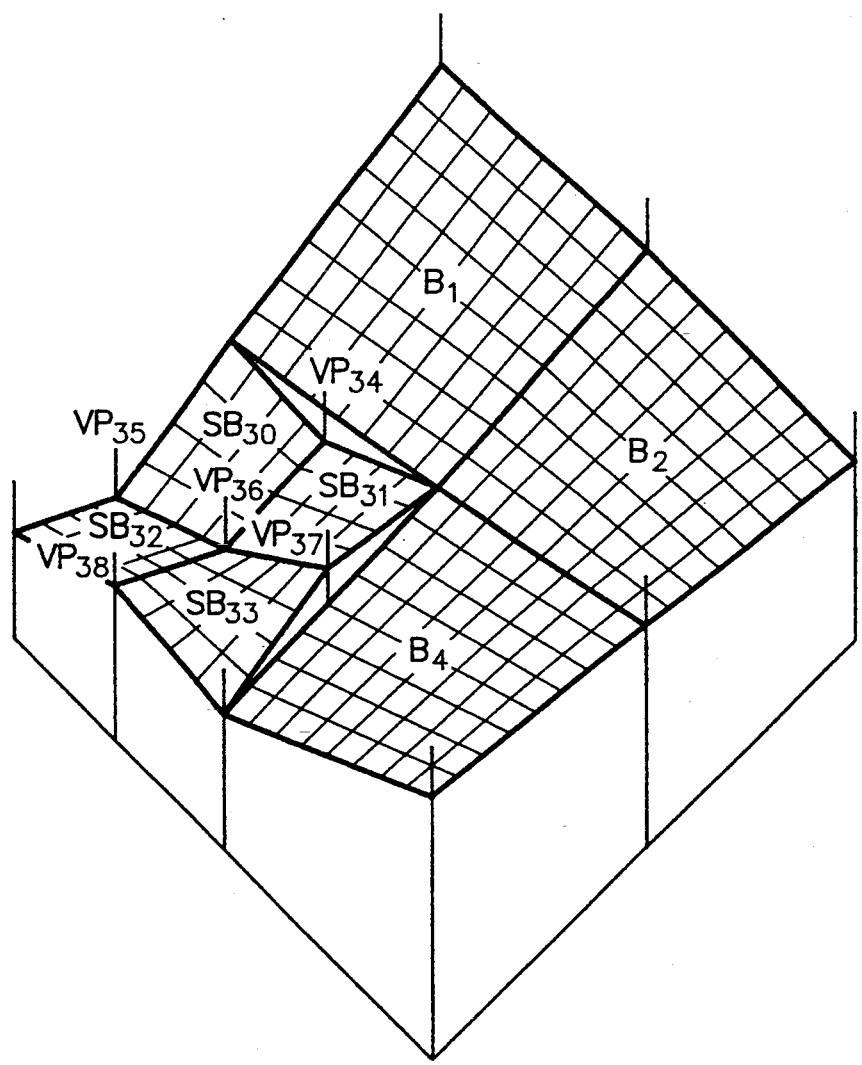
FIG. 15 is a three dimensional illustration of the averaging method applied to the data of FIG. 7.
Figure 16:
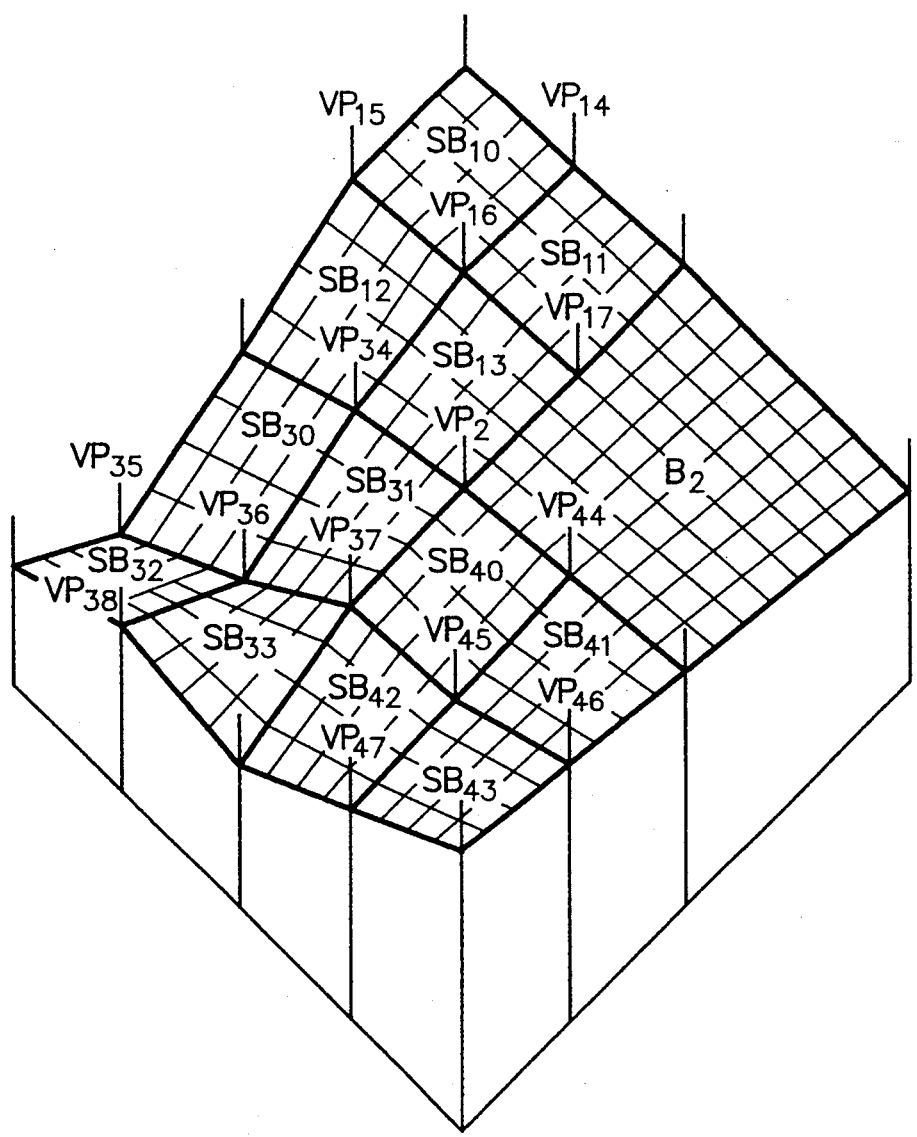
FIG. 16 is a three dimensional illustration the result of the edge artifact elimination applied to the data of FIG. 15.

FIG. 15 illustrate the averaging method applied to the data of FIG. 7. FIG. 16 illustrates the result of this effect for the Division Method of correction applied to Blocks B₄ and B₁ of FIG. 15. Note that only the Vertex Points along the edge are changed affecting only those areas between the adjoining edges and the nearest row of interior Vertex Points.

Each Pixel Value Generator 32a through 32n computes the value of each Pixel for Blocks and Sub-blocks for which one or more of their Vertex Point values differ from those of the previous frame. Each Pixel Value Generator 32a through 32n provides these new pixel values and their locations to an Output Buffer 33. Output Buffer 33 replaces the pixel values affected with these new pixel values. Hence Output Buffer 33 contains all the pixel values of the instant frame, e.g., the pixel values of a prior frame that is consistent with that of the instant frame, and the new pixel values of the instant frame. Output Buffer 33 formats these pixel values to properly interface a Display 34 and provides it to Display 34.

The Methods and Devices for Self-correcting Video Compression can be implemented in hardware, software, firmware or any combination thereof. As has been shown, it is amenable to various levels of multiprocessing. Attached hereto and incorporated in its entirety by reference, is Appendix A, in Microfiche form, a pseudo code implementation of the methods.

Additions, subtractions, deletions and other modifications of the preferred particular embodiments of the invention will be apparent to those skilled in the art and are within the scope of the following claims.

I claim:

1. A system for self-correcting video compression, comprising:
   an encoder responsive to a sequence of image frames and decoder means coupled to said encoder for generating and outputting a sequence of decoder outputs to control the operation of a display;
   said encoder including
      modeling means for modeling said decoder means for producing a sequence of modeled representations of the decoder outputs, one for each image frame,
      an encoder buffer,
      storing means for storing in said encoder buffer a modeled representation of each of the decoder outputs respectively in seriatim so that each modeled representation is held static for a time necessary to eliminate any race conditions,
      encoder differentiating means for generating a difference between each of the image frames and the modeled decoder output representation for the immediately preceding image frame stored in said encoder buffer, thereby modeling a feedback around said encoder and said decoder means, and
      converting means for converting each of the differences into an encoder record;
   said decoder means responsive to the sequence of encoder records including
      integrating means for producing the sequence of decoder outputs, one for each encoder record, by integrating each of the encoder records into the immediately preceding decoder output stored in said decoder buffer thereby generating the decoder output for that record by a recursive operation, and
      a decoder buffer,
      means for storing in said decoder buffer each of the decoder outputs respectively in seriatim to eliminate any race conditions common to such a recursive operation, and
      means for outputting the sequence of decoder outputs to control the operation of a display;
   whereby the modeled feedback compensates for any changes caused by said encoder and the said decoder means, singly and in combination, to the decoder output for the immediately preceding image frame when the record is generated for each image frame.

2. The system of claim 1, further comprising the subsystem of:
   means for encoding said encoder records for generating a signal compatible with transmitting over a communications system;
   means for receiving said communications compatible signal in the decoder means; and
   means for deriving said encoder records from the received communications compatible signal.

3. The system of claim 1, further comprising the subsystem of:
   means for encoding the encoder records for generating a signal compatible with inputting to a storage system;
   means for receiving an output signal from the storage system in the decoder means; and
   means for deriving said encoder records from the received storage output signal.

4. A system for self-correcting video compression, comprising:
   an encoder responsive to a sequence of image frames and decoder means coupled to said encoder for generating and outputting a sequence of decoder outputs to control the operation of a display;
   said encoder including
      blocking means for partitioning each of the image frames into a set of rectangular sub-images, such that adjoining corners of adjacent sub-images are at a single point,
      vertex point assigning means for assigning vertex points, including assigning a vertex point at each point shared by adjoining corners and at each corner of each of the image frames,
      best fit surface generating means for determining the best fit surface for each sub-image,
      best fit surface encoding means for determining the value of the best fit surface of each sub-image at each vertex point that contacts that sub-image,
      encoder surface representation means for converting the values at the vertex points of each sub-image of each image frame into an encoder surface representation of that frame,
      modeling means for modeling said decoder means for producing a sequence of modeled decoder surface representations, one decoder surface representation for each image frame,
      an encoder buffer,
      storing means for storing in said encoder buffer each of the modeled decoder surface representations respectively in seriatim so that each modeled representation is held static for a time necessary to eliminate any race conditions,
      differentiating means for generating a difference between each of the encoder surface representations and the modeled decoder surface representation for the immediately preceding image frame stored in said encoder buffer, thereby modeling a feedback around said encoder and said decoder means, and converting means for converting each of the differences into an encoder record;

said decoder means responsive to the sequence of encoder records including integrating means for producing the sequence of the decoder surface representations, one for each encoder record, by integrating each of the encoder records into the immediately preceding decoder surface representation stored in said decoder buffer thereby generating the decoder surface representation for that record by a recursive operation, a decoder buffer, means for storing in said decoder buffer each of the decoder surface representations respectively in seriatim converting means for converting the decoder surface representations into a sequence of decoder outputs, and means for outputting the sequence of decoder outputs to control the operation of a display;

whereby the modeled feedback compensates for any changes caused by said encoder and said decoder means, singly and in combination, to the decoder surface representation for the immediately preceding image frame when the encoder record is generated for each image frame.

5. The system of claim 4, wherein the means for determining a best fit best fit surface is a means for determining a best fit Lagrange polynomial of degree p for each said sub-image, said surface is represented by a set of vertex point parameters.

6. The system of claim 5, wherein p=1.

7. The system of claim 5, wherein p=2.

8. The system of claim 4, further comprising the sub-system of:

means coupled to the encoder for determining all sub-images whose best fit primary surfaces do not represent these sub-images with sufficient accuracy;

means coupled to the encoder for selecting all sub-images, in the encoder whose best fit primary surfaces do not represent these sub-images with sufficient accuracy;

means for determining an improved best fit surface for each selected sub-image, said improved best fit surface is represented by a set of vertex point parameters; and means for replacing the best fit surface for each selected sub-image with said improved best fit surface in the encoder surface representation of the image frame.

9. The system of claim 8, wherein the means for determining an improved best fit surface, is a means for generating a surface of complexity higher than that of the best fit surface, said surface is represented by a set of vertex point parameters, and the means for replacing the best fit surface of each selected sub-image with said improved best fit surface is to replace the set of the best fit surface vertex point parameters of each selected sub-image surface with the set of the vertex point parameters of the improved best fit surface for that sub-image.

10. The system of claim 9, wherein the means for determining an improved best fit surface of complexity higher than that of the best fit surface, is a means for determining a best fit Lagrange polynomial of degree t, where t is greater than p, for each said sub-image, said surface is represented by a set of vertex point parameters.

11. The system of claim 10, further comprising the sub-system of:

means for identifying all vertex points of the encoder surface representation of each image frame having multiple values;

means for replacing the multiple values of each identified vertex point with the mean of these values;

means for recognizing all pairs of adjacent sub-images containing one sub-image whose best fit surface represents that sub-image with sufficient accuracy and the other sub-image that requires an improved best fit surface;

means for converting the representation of the surface of the sub-image whose best fit surface represents that sub-image with sufficient accuracy from a best fit surface representation to an improved best fit surface representation; and means for replacing the values of each vertex point that now has multiple values by the value of that vertex point of the sub-image that required an improved best fit surface;

whereby the artifacts caused by multiple values on vertex points and the artifacts generated by improved best fit surfaces having extra vertex points along the edges are eliminated.

12. The system of claim 11, further comprising the sub-system of:

means for indicating vertex points of the encoder surface representation of the image frame which have comparable vertex points in the modeled decoder surface representation of the previous frame stored in the encoder buffer;

means for designating each indicated vertex point whose value differs by no more than a threshold value from the value of the comparable vertex point of the modeled decoder surface representation of the previous frame stored in the encoder buffer; and means for preventing encoding said designated vertex points;

thereby not encoding any vertex point whose value does not differ significantly from that of the comparable vertex point in the decoder.

13. The system of claim 8, wherein the means for determining an improved best fit surface, is a means for determining a surface of complexity higher than that of the best fit surface having vertex points on the boundary of the sub-image identical to those of the best fit surface, for preventing the creation of artifacts along said borders.

14. The system of claim 13, further comprising the sub-system of:

means for identifying all vertex points of the encoder surface representation of the image frame having multiple values; and means for replacing the multiple values of each identified vertex point with the mean of these values;

whereby the artifacts caused by multiple values on vertex points are eliminated.

15. The system of claim 14, further comprising the sub-system of:

means for indicating vertex points of the encoder surface representation of the image frame which have comparable vertex points in the modeled decoder surface representation of the previous frame stored in the encoder buffer;

means for designating each indicated vertex point whose value differs by no more than a threshold value from the value of the comparable vertex point of the modeled decoder surface representation of the previous frame stored in the encoder buffer; and means for preventing encoding said designated vertex points;

thereby not encoding any vertex point whose value does not differ significantly from that of the comparable vertex point in the decoder.

16. The system of claim 8, wherein the means for determining an improved best fit surface of complexity higher than that of the best fit surface, is a sub-system comprising:

means for partitioning said sub-image into sub-sub-images; and means for determining a best fit surface for each said sub-sub-image, said improved best fit surface is the union of the best fit surfaces of all of the sub-sub-images of the sub-image and is represented by the union of all vertex point parameters of all the best fit surfaces.

17. The system of claim 16, further comprising the sub-system of:

means for identifying all vertex points of the encoder surface representation of the image frame having multiple values; and means for replacing the multiple values of each identified vertex point with the mean of these values;

means for recognizing all pairs of adjacent sub-images containing one sub-image whose best fit surface represents that sub-image with sufficient accuracy and the other sub-image that required an improved best fit surface;

means for converting the representation of the surface of the sub-image whose best fit surface represents that sub-image with sufficient accuracy from a best fit surface representation to an improved surface representation; and means for replacing the values of each vertex point that now has multiple values by the value of that vertex point of the sub-image that required an improved best fit surface;

whereby the artifacts caused by multiple values on vertex points and the artifacts generated by improved best fit surfaces having extra vertex points along the edges are eliminated.

18. The system of claim 17, further comprising the sub-system of:

means for indicating vertex points of the encoder surface representation of the image frame which have comparable vertex points in the modeled decoder surface representation of the previous frame stored in the encoder buffer;

means for designating each indicated vertex point whose value differs by no more than a threshold value from the value of the comparable vertex point of the modeled decoder surface representation of the previous frame stored in the encoder buffer; and means for preventing encoding said designated vertex points;

thereby not encoding any vertex point whose value does not differ significantly from that of the comparable vertex point in the decoder.

19. A computer program for commanding a first computing device containing a first buffer means which is responsive to a sequence of image frames, and at least one other computing device containing a second buffer means which is coupled to said first computing device for generating and outputting a sequence of decoder outputs to control the operation of a display comprising:

a sub-program for commanding said first computing device for performing a method of encoding the sequence of image frames, the method including the steps of (a) generating a first encoder record of a sequence of encoder records from the first image frame of the sequence of image frames, (b) modeling said other computing device in said first computing device for producing a modeled representation of a first decoder output of the sequence of decoder outputs, (c) storing the modeled representation of the decoder output in said first buffer means, (d) generating a difference between the next image frame of the sequence of image frames and the instant modeled decoder output representation stored in said first buffer means, thereby modeling a feedback around said first computing device and said other computing device, (e) converting the difference into the next of the sequence of encoder records, (f) modeling the other computing device in the first computing device for producing the next modeled representation of a decoder output, and (g) branching to said step of storing the modeled representation;

a sub-program for commanding said other computing device responsive to the sequence of encoder records for performing a method of decoding the sequence of encoder records, the method including the steps of (h) generating the first decoder output from the first encoder record of the sequence of encoder records, (i) storing the first decoder output in said second buffer means, (j) integrating each of the remaining encoder records, respectively in seriatim into the immediately preceding decoder output stored in the decoder buffer means, for generating the instant decoder output, thereby the decoder outputs are computed in a recursive manner, (k) storing each of the decoder outputs respectively in seriatim in the decoder buffer means, and (l) outputting the sequence of decoder outputs to control the operation of a display;

whereby the modeled feedback compensates for any changes caused by the first computing device and the other computing device, singly and in combination, to the decoder output for the immediately preceding image frame when the record is generated for each image frame.

20. The computer program of claim 19, further comprising:

a sub-program for commanding the first computing device for performing the steps of encoding the encoder records for generating a signal compatible with transmitting over a communications system;

a sub-program for commanding the other computing device for performing the steps of receiving said communications compatible signal, and deriving the encoder records from the received communications compatible signal.

21. The computer program of claim 19, further comprising:

a sub-program for commanding the first computing device for performing the steps of encoding the encoder records for generating a signal compatible with input to a storage system;

a sub-program for commanding the other computing device for performing the steps of receiving a signal compatible with output from a storage system, and deriving the encoder records from the received storage compatible signal.

22. A computer program for commanding a first computing device containing a first buffer means which is responsive to a sequence of image frames, and at least one other computing device containing a second buffer means which is coupled to said first computing device for generating and outputting a sequence of decoder outputs to control the operation of a display comprising:

a sub-program for commanding said first computing device for performing a method of encoding the sequence of image frames, the method including the steps of (a) partitioning in said first computing device each image frame in the sequence of image frames into a set of rectangular sub-images, such that adjoining corners of adjacent sub-images are at a single point, (b) assigning a set of vertex points, including assigning a vertex point at each point shared by adjoining corners and at each corner of each image frame in the sequence of image frames, (c) determining a best fit surface for each sub-image, (d) determining the value of the best fit surface of each sub-image at each vertex point that contacts that sub-image, (e) converting the values at the vertex points of each sub-image of each image frame into an encoder surface representation for that image frame, (f) generating a first encoder record of a sequence of encoder records from the first image frame of the sequence of image frames, (g) modeling said other computing device in said first computing device for producing a modeled representation of a first decoder surface representation of the sequence of decoder surface representations, (h) storing the modeled decoder surface representation in said first buffer means, (i) generating a difference between the next encoder surface representation of the sequence of encoder surface representations and the instant modeled decoder surface representation stored in said first buffer means, thereby modeling a feedback around said first computing device and said other computing device, (j) converting the difference into the next of the sequence of encoder records, (k) modeling said other computing device in said first computing device for producing the next modeled decoder surface representation, and (l) branching to said step of storing the modeled representation;

a sub-program for commanding said other computing device responsive to the sequence of encoder records for performing a method of decoding the sequence of encoder records, the method including the steps of (m) generating the first decoder surface representation from the first encoder record of the sequence of encoder records, (n) storing the first decoder surface representation in said second buffer means, (o) integrating each of the remaining encoder records, respectively in seriatim into the immediately preceding decoder surface representation stored in the decoder buffer means, for generating the instant decoder surface representation, thereby the decoder surface representations are computed in a recursive manner, (p) storing each of the decoder surface representations respectively in seriatim in said decoder buffer means, (q) converting the decoder surface representations into decoder outputs, and (r) outputting a sequence of decoder outputs to control the operation of a display;

whereby the modeled feedback compensates for any changes caused by said first computing device and said other computing device, singly and in combination, to the decoder surface representation for the immediately preceding image frame when the record is generated for each image frame.

23. The computer program of claim 22, wherein the step for determining a best fit surface is generating a best fit Lagrange polynomial of degree p for each said sub-image, said surface is represented by a set of vertex point parameters.

24. The computer program of claim 23, wherein $p=1$.

25. The computer program of claim 23, wherein $p=2$.

26. The computer program of claim 22, further comprising:

a sub-program for commanding the first computing device for performing the steps of selecting all sub-images whose best fit surfaces do not represent them with sufficient accuracy, generating an improved best fit surface for each selected sub-image, said improved best fit surface is represented by a set of vertex point parameters; and replacing the best fit surface for each selected sub-image with said improved best fit surface in the union of the best fit surfaces that comprises the encoder surface representation of each of the sequence of image frames.

27. The computer program of claim 26, wherein the step for determining an improved best fit surface, is determining a surface of complexity higher than that of the best fit surface, said surface is represented by a set of vertex point parameters.

28. The computer program of claim 27, wherein the step for determining an improved best fit surface of complexity higher than that of the best fit surface, is determining a best fit Lagrange polynomial of degree t, where t is greater than p, for each said sub-image, said improved best fit surface is represented by a set of vertex point parameters.

29. The computer program of claim 28, further comprising:
a sub-program for commanding the first computing device for performing the steps of
identifying all vertex points of the encoder surface representation of each of the image frames having multiple values,
replacing the multiple values of each identified vertex point with the mean of these values,
recognizing all pairs of adjacent sub-images containing one sub-image whose best fit surface represents that sub-image with sufficient accuracy, and the other sub-image that requires an improved best fit surface,
converting the representation of the surface of the sub-image whose best fit surface represents that sub-image with sufficient accuracy from a best fit surface representation to an improved surface representation, and
replacing the values of each vertex point that now has multiple values by the value of the sub-image that required an improved best fit at that vertex point;
whereby the artifacts caused by multiple values on vertex points and the artifacts generated by improved best fit surfaces having extra vertex points along the edges are eliminated.

30. The computer program of claim 29, further comprising:
a sub-program for commanding the first computing device for performing the steps of
indicating vertex points of the encoder surface representation of the image frame which have comparable vertex points in the modeled decoder surface representation of the previous frame stored in the first buffer means,
designating each indicated vertex point whose value differs by no more than a threshold value from the value of the comparable vertex point of the modeled decoder surface representation of the previous frame stored in the first buffer means, and
preventing encoding said designated vertex points;
thereby not encoding any vertex point whose value does not differ significantly from that of the comparable vertex point in the other computing device.

31. The computer program of claim 27, wherein the determining an improved best fit surface, is determining a surface of complexity higher than that of the best fit surface having vertex points on the boundary of the sub-image identical to those of the best fit surface, for preventing the creation of artifacts along said borders.

32. The computer program of claim 31, further comprising:
a sub-program for commanding the first computing device for performing the steps of
identifying all vertex points of the encoder surface representation of the image frame having multiple values, and
replacing the multiple values of each identified vertex point with the mean of these values;
whereby the artifacts caused by multiple values on vertex points are eliminated.

33. The computer program of claim 32, further comprising;
a sub-program for commanding the first computing device for performing the steps of
indicating vertex points of the encoder surface representation of the image frame which have comparable vertex points in the modeled decoder surface representation of the previous frame stored in the first buffer means,
designating each indicated vertex point whose value differs by no more than a threshold value from the value of the comparable vertex point of the modeled decoder surface representation of the previous frame stored in the first buffer means, and
preventing encoding said designated vertex points;
thereby not encoding any vertex point whose value doesn't differ significantly from that of the comparable vertex point in the second computing device.

34. The computer program of claim 27, wherein determining an improved best fit surface of complexity higher than that of the best fit surface, are the steps comprising:
partitioning said sub-image into sub-sub-images, and
generating a best fit surface for each said sub-sub-image, said improved best fit surface is the union of the best fit surfaces of all of the sub-sub-images of the sub-image and is represented by the union of all vertex point parameters of all the best fit surfaces.

35. The computer program of claim 34, further comprising:
a sub-program for commanding the first computing device for performing the steps of
identifying all vertex points of the encoder surface representation of the image frame having multiple values,
replacing the multiple values of each identified vertex point with the mean of these values,
recognizing all pairs of adjacent sub-images containing one sub-image whose best fit surface represents that sub-image with sufficient accuracy, and the other sub-image that required an improved best fit surface,
converting the representation of the surface of the sub-image whose best fit surface represents that sub-image with sufficient accuracy from a best fit surface representation to an improved surface representation, and
replacing the values of each vertex point that now has multiple values by the value of the sub-image that required an improved best fit surface at that vertex point;
whereby the artifacts caused by multiple values on vertex points and the artifacts generated by improved best fit surfaces having extra vertex points along the edges are eliminated.

36. The computer program of claim 35, further comprising:
a sub-program for commanding the first computing device for performing the steps of
indicating vertex points of the encoder surface representation of the image frame which have comparable vertex points in the modeled decoder surface representation of the previous frame stored in the first buffer means,
designating each indicated vertex point whose value differs by no more than a threshold value from the value of the comparable vertex point of the modeled decoder surface representation of the previous frame stored in the first buffer means, and preventing encoding said designated vertex points; thereby not encoding any vertex point whose value doesn't differ significantly from that of the comparable vertex point in the second computing device.

37. A method for self-correcting video compression, comprising:

an encoder containing an encoder buffer, said encoder responsive to a sequence of image frames for generating a sequence of encoder records, one for each image frame, and at least one decoder containing a decoder buffer coupled to said encoder, said encoder generating and outputting a sequence of decoder outputs, one for each image frame, to control the operation of a display;

said encoder executing the steps of
- (a) generating the first encoder record of the set of encoder records from the first image frame,
- (b) modeling said decoder for producing a modeled representation of the first decoder output,
- (c) storing the modeled representation of the decoder output in said encoder buffer,
- (d) generating a difference between the next image frame and the instant modeled decoder output representation stored in said encoder buffer, thereby modeling a feedback around said encoder and said decoder,
- (e) converting the difference into the next of the set of encoder records,
- (f) modeling said decoder in said encoder for producing the modeled representation of the decoder output of the sequence of decoder outputs,
- (g) branching to said step of storing modeled representation; said decoder executing the steps of
- (h) generating the first decoder output from the first encoder record,
- (i) storing the first decoder output in said decoder buffer,
- (j) integrating each of the remaining encoder records, respectively in seriatim into the immediately preceding decoder output stored in said decoder buffer, for generating the instant decoder output, thereby the decoder outputs are computed in a recursive manner,
- (k) storing each of the decoder outputs respectively in seriatim in said decoder buffer; and
- (l) outputting the sequence of decoder outputs to control the operation of a display;

whereby the modeled feedback compensates for any changes caused by said first computing device and said other computing device, singly and in combination, to the decoder output for the immediately preceding image frame when the record is generated for each image frame.

38. The method of claim 37, further comprising the steps of:

encoding the encoder records for generating a signal compatible with transmitting over a communications system;

receiving said communications compatible signal in the decoder means; and deriving said encoder records from the received communications compatible signal.

39. The method of claim 37, further comprising the steps of:

encoding the encoder records for generating a signal compatible with inputting to a storage system;

receiving an output signal from the storage system in the decoder means; and deriving said encoder records from the received storage output signal.

40. A method for self-correcting video compression, comprising:

an encoder containing an encoder buffer responsive to a sequence of image frames for generating a sequence of encoder records, one for each image frame, and at least one decoder containing a decoder buffer coupled to said encoder for generating and outputting a sequence of decoder outputs, one for each image frame, to control the operation of a display;

said encoder executing the steps of
- (a) partitioning each image frame in the sequence of image frames into a set of rectangular sub-images, such that adjoining corners of adjacent sub-images are at a single point,
- (b) assigning a set of vertex points, including assigning a vertex point at each point shared by adjoining corners and at each corner of each image frame in the sequence of image frames,
- (c) determining a best fit surface for each sub-image,
- (d) determining the value of the best fit surface of each sub-image at each vertex point that contacts that sub-image,
- (e) generating a sequence of encoder surface representations for the sequence of image frames, one for each image frame, by converting the values at the vertex points of each sub-image of each image frame,
- (f) generating a first encoder record from the first of the set of encoder surface representations of the image frames,
- (g) modeling said decoder in said encoder for producing a modeled representation of the first decoder surface representation,
- (h) storing the modeled decoder surface representation in the encoder buffer,
- (i) generating a difference between the next encoder surface representation and the instant modeled decoder surface representation stored in said encoder buffer, thereby modeling a feedback around said encoder and said decoder,
- (j) converting the difference into the next of the set of encoder records,
- (k) modeling said decoder in said encoder for producing the modeled representation of the next decoder surface representation, and
- (l) branching to said step of storing modeled representation;

said decoder executing the steps of
- (n) generating the first decoder surface representation from the first encoder record,
- (o) storing the first decoder surface representation in said decoder buffer,
- (p) integrating each of the remaining encoder records, respectively in seriatim into the immediately preceding decoder surface representation stored in said decoder buffer, for generating the instant decoder surface representation, thereby computing the decoder surface representations in a recursive manner,
- (q) storing each of the decoder surface representations respectively in seriatim in said decoder buffer, (r) converting the sequence of decoder surface representations into a sequence of decoder outputs, and (s) outputting the sequence of decoder outputs to control the operation of a display;

whereby the modeled feedback compensates for any changes caused by said first computing device and said other computing device, singly and in combination, to the decoder surface representation for the immediately preceding image frame when the record is generated for each image frame.

41. The method of claim 40, wherein said step of determining a best fit surface is determining a best fit Lagrange polynomial of degree p for each said sub-image, said surface is represented by a set of vertex point parameters.

42. The method of claim 44, wherein p=1.

43. The method of claim 41, wherein p=2.

44. The method of claim 40, further comprising the steps of:

determining, in the encoder, all sub-images whose best fit surfaces do not represent these sub-images with sufficient accuracy;

selecting all sub-images, in the encoder whose best fit surfaces do not represent these sub-images with sufficient accuracy;

determining an improved best fit surface for each selected sub-image, said improved best fit surface is represented by a set of vertex point parameters; and replacing the best fit surface of each selected sub-image with said improved best fit surface in the encoder surface representation of the image frame.

45. The method of claim 44, wherein determining an improved best fit surface, is generating a surface of complexity higher than that of the best fit surface, said surface is represented by a set of vertex point parameters, and replacing the best fit surface of each selected sub-image with said improved best fit surface is to replace the set of the best fit surface vertex point parameters of each selected sub-image surface with the set of the vertex point parameters of the improved best fit surface for that sub-image.

46. The method of claim 45, wherein determining an improved best fit surface of complexity higher than that of the best fit surface, is determining a best fit Lagrange polynomial of degree t, where t is greater than p, for each said sub-image, said surface is represented by a set of vertex point parameters.

47. The method of claim 46, further comprising the steps of:

identifying all vertex points of the encoder surface representation of each image frame having multiple values;

replacing the multiple values of each identified vertex point with the mean of these values;

recognizing all pairs of adjacent sub-images containing one sub-image whose best fit surface represents that sub-image with sufficient accuracy and the other sub-image that requires an improved best fit surface;

converting the representation of the surface of the sub-image whose best fit surface represents that sub-image with sufficient accuracy from a best fit surface representation to an improved best fit surface representation; and replacing the values of each vertex point that now has multiple values by the value of that vertex point of the sub-image that required an improved best fit surface;

whereby the artifacts caused by multiple values on vertex points and the artifacts generated by improved best fit surfaces having extra vertex points along the edges are eliminated.

48. The method of claim 47, further comprising the steps of:

indicating vertex points of the encoder surface representation of the image frame which have comparable vertex points in the modeled decoder surface representation of the previous frame stored in the encoder buffer;

designating each indicated vertex point whose value differs by no more than a threshold value from the value of the comparable vertex point of the modeled decoder surface representation of the previous frame stored in the encoder buffer; and preventing encoding said designated vertex points;

thereby not encoding any vertex point whose value does not differ significantly from that of the comparable vertex point in the decoder.

49. The method of claim 44, wherein determining an improved best fit surface, is determining a surface of complexity higher than that of the best fit surface having vertex points on the boundary of the sub-image identical to those of the best fit surface, for preventing the creation of artifacts along said borders.

50. The method of claim 49, further comprising the steps of: identifying all vertex points of the encoder surface representation of the image frame having multiple values; and replacing the multiple values of each identified vertex point with the mean of these values;

whereby the artifacts caused by multiple values on vertex points are eliminated.

51. The method of claim 50, further comprising the steps of:

indicating vertex points of the encoder surface representation of the image frame which have comparable vertex points in the modeled decoder surface representation of the previous frame stored in the encoder buffer;

designating each indicated vertex point whose value differs by no more than a threshold value from the value of the comparable vertex point of the modeled decoder surface representation of the previous frame stored in the encoder buffer; and preventing encoding said designated vertex points;

thereby not encoding any vertex point whose value does not differ significantly from that of the comparable vertex point in the decoder.

52. The method of claim 44, wherein determining an improved best fit surface of complexity higher than that of the best fit surface, is a method comprising the steps of:

partitioning said sub-image into sub-sub-images; and determining a best fit surface for each said sub-sub-image, said improved best fit surface is the union of the best fit surfaces of all of the sub-sub-images of the sub-image and is represented by the union of all vertex point parameters of all the best fit surfaces;

53. The method of claim 52, further comprising the steps of:

identifying all vertex points of the encoder surface representation of the image frame having multiple values; and replacing the multiple values of each identified vertex point with the mean of these values;

recognizing all pairs of adjacent sub-images containing one sub-image whose best fit surface represents that sub-image with sufficient accuracy and the other sub-image that required an improved best fit surface;

converting the representation of the surface of the sub-image whose best fit surface represents that sub-image with sufficient accuracy from a best fit surface representation to an improved best fit surface representation; and replacing the values of each vertex point that now has multiple values by the value of that vertex point of the sub-image that required an improved best fit surface;

whereby the artifacts caused by multiple values on vertex points and the artifacts generated by improved best fit surfaces having extra vertex points along the edges are eliminated.

54. The method of claim 53, further comprising the steps of:

indicating vertex points of the encoder surface representation of the image frame which have comparable vertex points in the modeled decoder surface representation of the previous frame stored in the encoder buffer;

designating each indicated vertex point whose value differs by no more than a threshold value from the value of the comparable vertex point of the modeled decoder surface representation of the previous frame stored in the encoder buffer; and preventing encoding said designated vertex points;

thereby not encoding any vertex point whose value does not differ significantly from that of the comparable vertex point in the decoder.

* * * * *